(12) United States Patent
Fang et al.

(10) Patent No.: US 12,320,974 B2
(45) Date of Patent: Jun. 3, 2025

(54) LIGHT CONTROL APPARATUS, PASSIVE LIGHT-EMITTING IMAGE SOURCE AND HEAD-UP DISPLAY SYSTEM

(71) Applicant: FUTURUS TECHNOLOGY CO., LTD., Beijing (CN)

(72) Inventors: Tao Fang, Beijing (CN); Junfeng Xu, Beijing (CN); Huijun Wu, Beijing (CN)

(73) Assignee: FUTURUS TECHNOLOGY CO., LTD., Beijing (CN)

( * ) Notice: Subject to any disclaimer, the term of this patent is extended or adjusted under 35 U.S.C. 154(b) by 553 days.

(21) Appl. No.: 17/610,305

(22) PCT Filed: May 15, 2020

(86) PCT No.: PCT/CN2020/090641
§ 371 (c)(1),
(2) Date: Nov. 10, 2021

(87) PCT Pub. No.: WO2020/233530
PCT Pub. Date: Nov. 26, 2020

(65) Prior Publication Data
US 2022/0214542 A1 Jul. 7, 2022

(30) Foreign Application Priority Data

May 17, 2019 (CN) .......................... 201910412218.0
Apr. 15, 2020 (CN) .......................... 202010295102.6

(51) Int. Cl.
*G02B 27/01* (2006.01)
*G02B 27/30* (2006.01)
*G02F 1/1335* (2006.01)

(52) U.S. Cl.
CPC ......... *G02B 27/0101* (2013.01); *G02B 27/30* (2013.01); *G02F 1/133514* (2013.01);
(Continued)

(58) Field of Classification Search
CPC ................ G02B 27/0101; G02B 27/30; G02B 2027/0112; G02B 2027/013; G02F 1/133514; G02F 1/133528
(Continued)

(56) References Cited

U.S. PATENT DOCUMENTS 5,601,352 A 2/1997 Okamura
2002/0036831 A1* 3/2002 Inoguchi ............ G02B 27/0172
359/629
(Continued)

FOREIGN PATENT DOCUMENTS

CN 205982817 U 2/2017
CN 206618901 U 11/2017
(Continued)

OTHER PUBLICATIONS

Extended European Search Report from Application No. 20809933.3 mailed May 25, 2023.

*Primary Examiner* — Michael H Caley
*Assistant Examiner* — William D Peterson
(74) *Attorney, Agent, or Firm* — Dilworth & Barrese, LLP.; Michael J. Musella, Esq.

(57) ABSTRACT

A light control apparatus, a passive light-emitting image source and a head-up display system are provided. The head-up display system includes a light source, a collimator element, a light concentrator element, a diffuser element, a liquid crystal panel and a transflective reflection device for displaying; the collimator element is configured to adjust an exit direction of light emitted by the light source into a preset angle range; the light concentrator element is configured to concentrate the light emitted by the light source; the diffuser element is configured to diffuse the light emitted by the light source; the liquid crystal panel is configured to convert the light emitted by the light source into imaging light, and allow the imaging light to be incident on the reflection (Continued)

device for displaying; and the reflection device for displaying is configured to reflect the imaging light to a preset region.

17 Claims, 32 Drawing Sheets

(52) U.S. Cl.
CPC ............... *G02F 1/133528* (2013.01); *G02B 2027/0112* (2013.01); *G02B 2027/013* (2013.01)

(58) Field of Classification Search
USPC .......................................... 359/630
See application file for complete search history.

(56) References Cited

U.S. PATENT DOCUMENTS

| | | | | |
|---|---|---|---|---|
| 2008/0106775 | A1* | 5/2008 | Amitai | G02B 5/0257 359/13 |
| 2010/0271698 | A1 | 10/2010 | Kessler | |
| 2016/0180922 | A1 | 6/2016 | Greene | |
| 2016/0266283 | A1 | 9/2016 | Segawa | |
| 2018/0356633 | A1 | 12/2018 | Song | |
| 2019/0025581 | A1 | 1/2019 | Nambara | |
| 2020/0225470 | A1 | 7/2020 | Miao et al. | |

FOREIGN PATENT DOCUMENTS

| | | |
|---|---|---|
| CN | 107577046 A | 1/2018 |
| CN | 108474948 A | 8/2018 |
| CN | 207867138 U | 9/2018 |
| JP | 2012-047934 A | 3/2012 |
| JP | 2012-203176 A | 10/2012 |
| JP | 2014-202835 A | 10/2014 |
| JP | 2016180922 A | 3/2015 |
| JP | 2017-097074 A | 6/2017 |
| JP | 2017-181645 A | 10/2017 |
| JP | 2018-025600 A | 2/2018 |
| KR | 10-2010-0002954 A | 1/2010 |
| KR | 1020250008425 A | 1/2014 |
| WO | 2017/002344 A1 | 1/2017 |
| WO | 2018229961 A1 | 12/2018 |

* cited by examiner

LIGHT CONTROL APPARATUS, PASSIVE LIGHT-EMITTING IMAGE SOURCE AND HEAD-UP DISPLAY SYSTEM

CROSS-REFERENCE TO RELATED APPLICATIONS

The present patent application claims priority of Chinese Patent Application No. 202010295102.6 filed on Apr. 15, 2020 and priority of Chinese Patent Application No. 201910412218.0 filed on May 17, 2019, the disclosure of which is incorporated herein by reference in its entirety as part of the present application.

TECHNICAL FIELD

Embodiments of the present disclosure relate to a light control apparatus, a passive light-emitting image source and a head-up display system.

BACKGROUND

The head-up display (HUD) technology adopts an optical reflection principle to project vehicle information such as vehicle speed on a windshield or other glass, which may avoid distraction caused by a driver looking down at a dashboard during driving, thereby bringing a better driving experience while improving a driving safety factor.

A common windshield HUD image source is mostly a liquid crystal display (LCD). If the HUD adopts a traditional LCD image source, brightness of an HUD image displayed through the windshield is low; and generally, brightness of the LCD image source needs to be increased to ensure the brightness of the HUD image displayed through the windshield, which not only leads to higher power consumption of the image source, but also causes greater heat generation, increasing heat dissipation requirements for HUD. When a large-sized image needs to be formed through the windshield, the power consumption of the image source in HUD will further increase.

A light source refers to an object that can emit electromagnetic waves in a certain wavelength range (e.g., visible light, ultraviolet, or infrared, etc.); for example, the object is a light emitting diode (LED). In a field of lighting and display imaging, the light source is an indispensable device.

Usually, a device containing a light source (e.g., a lighting device, or a liquid crystal display, etc.) simply uses light emitted by the light source; and the light source is usually a point light source or an approximate point light source, that is, the light source emits light around, and a usual light source device has a low utilization rate of the light source.

For example, when some display imaging devices (e.g., liquid crystal displays) use a backlight source for imaging, only a small portion of light emitted by the backlight source is used for imaging, resulting in low imaging brightness. Although the problem of low imaging brightness may be solved by increasing power of the light source, this will correspondingly bring about problems of high power consumption and great heat generation of the light source, thereby increasing heat dissipation requirements for the light source device.

SUMMARY

Embodiments of the present disclosure provide a light control apparatus, a passive light-emitting image source and a head-up display system.

Embodiments of the present disclosure provide a head-up display system, which includes: a light source, a collimator element, a light concentrator element, a diffuser element, a liquid crystal panel and a transflective reflection device for displaying; the light concentrator element, the diffuser element and the liquid crystal panel are on a same side of the light source in an overlapped manner; the collimator element is configured to adjust light emitted by the light source to exit in a direction at an angle within a preset angle range; the light concentrator element is configured to concentrate the light emitted by the light source; the diffuser element is configured to diffuse the light emitted by the light source; the liquid crystal panel is configured to convert the light emitted by the light source into imaging light, and allow the imaging light to be incident on the reflection device for displaying; and the reflection device for displaying is configured to reflect the imaging light to a preset region.

In some examples, the light emitted by the light source reaches the preset region after reaching the collimator element, the light concentrator element, the diffuser element, the liquid crystal panel and the reflection device for displaying; the light concentrator element is configured to concentrate the light emitted by the light source and light concentrated by the light concentrator element reaches a preset position in the preset region on the assumption that the diffuser element is removed from an optical path from the light source to the preset region, and an area of the preset position is smaller than an area of the preset region.

In some examples, the collimator element is partially or entirely arranged between the light source and the light concentrator element; and the collimator element is configured to emit adjusted light to the light concentrator element.

In some examples, the collimator element is configured to adjust the light emitted by the light source into parallel light.

In some examples, the collimator element is between the light source and the light concentrator element, and the collimator element includes at least one selected from the group consisting of a collimating lens and a collimating film; the collimating lens includes one or more selected from the group consisting of a convex lens, a Fresnel lens, and a combination of lenses.

In some examples, the collimator element includes the collimating lens, and a distance between the collimating lens and a position of the light source is equal to a focal length of the collimating lens.

In some examples, the collimator element includes a hollow lamp cup; the hollow lamp cup includes a hollow housing provided with an inner reflective surface, a port of the hollow lamp cup faces the light concentrator element, the light source is at an end portion of the hollow lamp cup and the end portion is away from the port.

In some examples, the collimator element is inside the hollow lamp cup, and a size of the collimator element is smaller than a size of the port of the hollow lamp cup; the collimator element is configured to collimate a portion of the light emitted by the light source in the hollow lamp cup and then emit the portion of the light to the light concentrator element; and the collimator element includes at least one selected from the group consisting of a collimating lens and a collimating film.

In some examples, the collimator element includes a lamp cup with a solid center; the lamp cup with a solid center is a transparent component with a solid center, and a refractive index of the transparent component with the solid center is larger than 1; a port of the lamp cup with a solid center faces the light concentrator element; the light source is at an end portion of the lamp cup with the solid center, the end portion is away from the port; and the light emitted by the light source is totally reflected when the light is incident on an inner surface of the transparent component with the solid center.

In some examples, a cavity is at the end portion of the lamp cup with a solid center away from the port of the lamp cup with the solid center, and a surface, close to the port of the lamp cup with the solid center, of the cavity is a convex surface; or a slot is in a central position, close to an end portion with the port of the lamp cup with the solid center, of the lamp cup with the solid center, and a bottom surface of the slot is a convex surface.

In some examples, the light concentrator element is between the collimator element and the diffuser element; and the light concentrator element is configured to emit concentrated light to the diffuser element.

In some examples, the light concentrator element includes one or more selected from the group consisting of a convex lens, a Fresnel lens, and a combination of lenses.

In some examples, a distance between the light concentrator element and a mirror position is a focal length of the light concentrator element; and the mirror position is a position of a virtual image formed by the preset position through the reflection device for displaying.

In some examples, the diffuser element includes a first diffuser element, and the first diffuser element is between the light source and the liquid crystal panel; the first diffuser element is configured to diffuse light concentrated by the light concentrator element.

In some examples, the diffuser element further includes a second diffuser element, and the first diffuser element and the second diffuser element are overlapped, and a preset distance is between the first diffuser element and the second diffuser element.

In some examples, the first diffuser element and the second diffuser element are respectively arranged on two sides of the light concentrator element; or, the first diffuser element and the second diffuser element are both arranged on a side, close to the liquid crystal panel, of the light concentrator element.

In some examples, the preset distance is in a range of 40 mm to 50 mm.

In some examples, the diffuser element includes a diffractive optical element or a scattering optical element.

In some examples, the diffractive optical element is configured such that light passing through the diffractive optical element is diffused by the diffractive optical element to form one or more observation ranges with a preset cross-sectional shape, and the preset cross-sectional shape includes a circle, an ellipse, a square, or a rectangle.

In some examples, the head-up display system further includes a polarization controller element, wherein the liquid crystal panel includes a first polarizer, a liquid crystal layer, and a second polarizer; the first polarizer and the second polarizer are respectively arranged on two sides of the liquid crystal layer; the first polarizer is between the liquid crystal layer and the light source; the first polarizer is configured to transmit first linearly polarized light; the second polarizer is configured to transmit second linearly polarized light, and a polarization direction of the second linearly polarized light is perpendicular to a polarization direction of the first linearly polarized light; the polarization controller element is between the light source and the first polarizer, and the polarization controller element is configured to transmit the first linearly polarized light and reflect or absorb the second linearly polarized light.

In some examples, the head-up display system further includes: a light blocking layer, the light blocking layer is on a side, away from the light source, of the liquid crystal panel, and the light blocking layer is configured to restrict an exit angle of exit light from the liquid crystal panel.

In some examples, the head-up display system further includes: a barrier layer, wherein the barrier layer is on a side of the liquid crystal panel, the side is away from the light source, a preset distance is between the barrier layer and the liquid crystal panel, and a barrier unit includes a liquid crystal, or the barrier layer includes an integral-type liquid crystal, and a plurality of barrier units arranged at intervals are formed by controlling a working state of a liquid crystal unit of the integral-type liquid crystal.

In some examples, the head-up display system further includes a light scattering layer, the light scattering layer is on a side, away from the liquid crystal panel, of the light blocking layer, and the light scattering layer is configured to scatter external ambient light.

In some examples, the head-up display system includes a plurality of light sources; the plurality of light sources are in different positions; and the light concentrator element is configured to concentrate light emitted by the plurality of light sources in the different positions.

In some examples, a count of collimator elements is plural, and different collimator elements are in different positions, and are configured to adjust exit directions of the light emitted by the plurality of light sources in the different positions, so that the exit directions of the light emitted by the plurality of light sources in the different positions all point to a same preset position.

In some examples, the light source is an electroluminescent array including one or more electroluminescent modules, and each of the electroluminescent modules includes one or more electroluminescent devices; and each of the electroluminescent modules is correspondingly provided with at least one hollow lamp cup.

In some examples, the light source includes a plurality of light sources groups; and light emitted by different light source groups is emitted to different directions or regions.

In some examples, the liquid crystal panel includes red, green and blue filters; or the liquid crystal panel includes a liquid crystal layer, the liquid crystal layer is a blue phase liquid crystal, and the light source includes a red light source, a green light source, and a blue light source; the red light source, the green light source, and the blue light source are configured to operate periodically, and not to operate at same time.

In some examples, the head-up display system further includes a liquid crystal converting layer, wherein the liquid crystal panel includes a liquid crystal layer; and the liquid crystal converting layer is on a side, away from the light source, of the light concentrator element; the liquid crystal converting layer includes a plurality of liquid crystal units arranged at intervals; and one liquid crystal unit in the liquid crystal converting layer corresponds to one liquid crystal unit in the liquid crystal layer; the liquid crystal units in the liquid crystal layer are configured to convert light in a first polarization direction into light in a second polarization direction; the liquid crystal units in the liquid crystal converting layer are configured to convert light in the second polarization direction into light in the first polarization direction; and the first polarization direction is perpendicular to the second polarization direction.

In some examples, a total area of all liquid crystal units in the liquid crystal converting layer is not less than half of a total area of all liquid crystal units in the liquid crystal layer.

In some examples, the head-up display system further includes: a cylindrical lens layer, wherein the cylindrical lens layer is on a side, away from the light source, of the liquid crystal layer; the cylindrical lens layer includes a plurality of vertically arranged cylindrical lenses, each cylindrical lens covers at least two different columns of liquid crystal units in the liquid crystal layer; the cylindrical lens is configured to emit light emitted from one column of liquid crystal units to a first position, and emit light emitted from the other column of liquid crystal units to a second position.

Embodiments of the present disclosure further provide a light control apparatus, which includes: a diffuser element and a direction controller element; the direction controller element is configured to concentrate light emitted by a plurality of light sources located in different positions; and the diffuser element is on a side, away from the plurality of light sources, of the direction controller element; and the diffuser element is configured such that light emitted by the direction controller element is diffused by the diffuser element and form a light spot.

In some examples, the light emitted by the plurality of light sources passes through the direction controller element and the diffuser element to reach a first preset region; the light concentrator element is configured to concentrate the light emitted by the plurality of light sources, and light concentrated by the light concentrator element reaches a second preset region in the first preset region on the assumption that the diffuser element is removed from an optical path from plurality of light sources to the first preset region, and an area of the second preset region is smaller than an area of the first preset region.

Embodiments of the present disclosure further provide a passive light-emitting image source, which includes a light source, a liquid crystal panel, and any one of the above light control apparatuses; the light source and the liquid crystal panel are respectively arranged on two sides of the direction controller element of the light control apparatus.

Embodiments of the present disclosure further provide a head-up display system, which includes any one of the above passive light-emitting image sources.

BRIEF DESCRIPTION OF THE DRAWINGS

In order to illustrate the embodiments of the present disclosure or the technical solutions in the prior art more clearly, the following will briefly introduce the drawings that need to be used in the description of the embodiments or the prior art. Obviously, the drawings in the following description are only some embodiments of the present disclosure. For those of ordinary skill in the art, other drawings can be obtained based on these drawings without creative effort.

FIG. 8a shows a third arrangement schematic diagram of collimator elements provided by an embodiment of the present disclosure;

FIG. 8b shows a fourth arrangement schematic diagram of collimator elements provided by an embodiment of the present disclosure;

DETAILED DESCRIPTION

Figure 1:
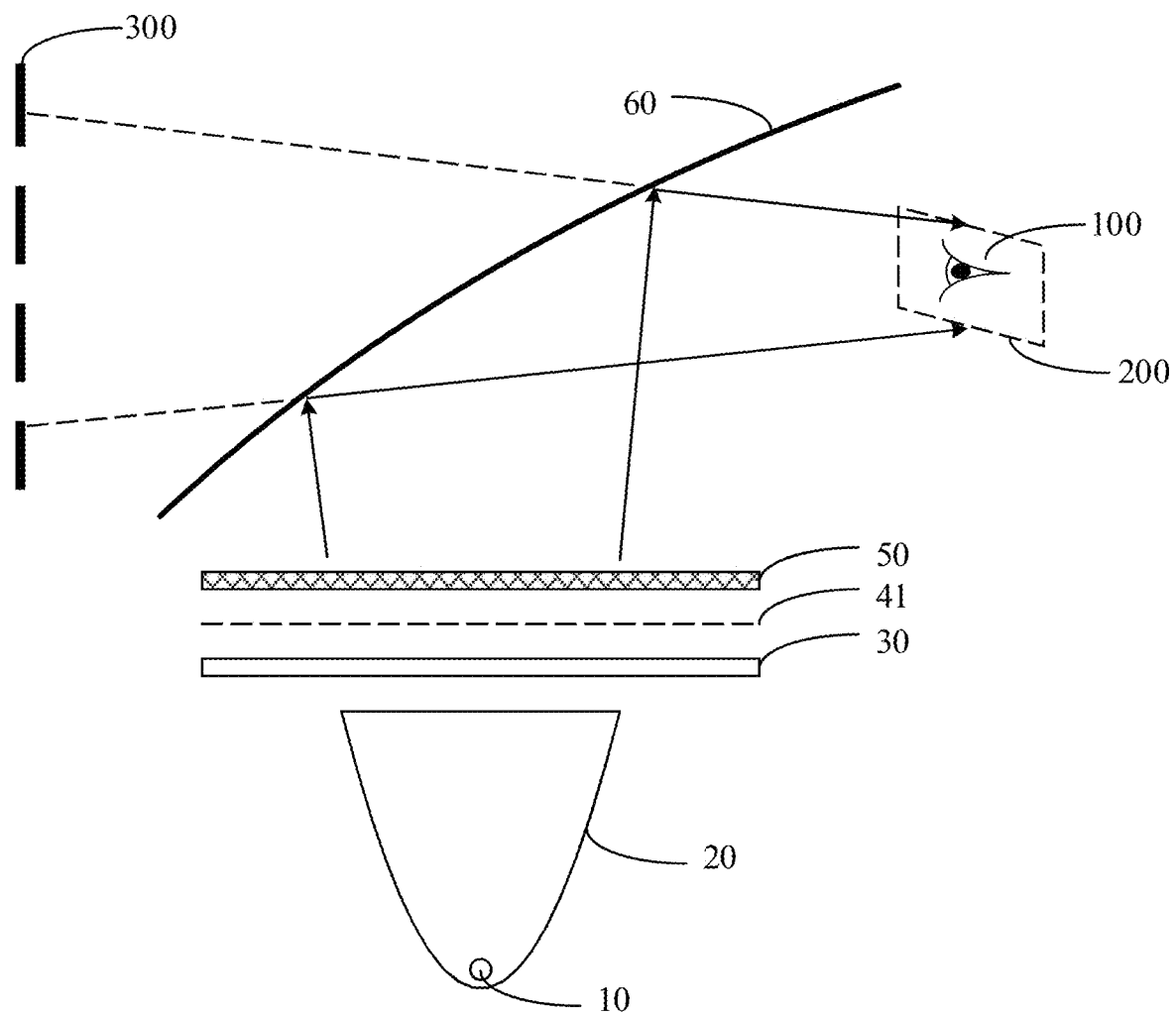
FIG. 1 shows a first structural schematic diagram of a head-up display system provided by an embodiment of the present disclosure.

In the description of the present disclosure, it should be understood that directional or positional relationships shown by terms such as "center", "longitudinal", "transverse", "length", "width", "thickness", "upper", "lower", "front", "rear", "left", "right", "vertical", "horizontal", "top", "bottom", "inner", "outer", "clockwise" and "counterclockwise" are directional or positional relationships shown as in the drawings, which only means to facilitate description of the present disclosure and simplify the description, but do not indicate or imply that the apparatuses or components must have specific directions, or be constructed or operated in the specific directions, and are not limitative of the present disclosure.

In addition, terms like "first" and "second" are merely used for the purpose of description other than indicating or implying their relative importance or implicitly denoting the number of technical features indicated thereby. Thus, features with "first" or "second" defined may include one or more of the features either explicitly or implicitly. In the description of the present disclosure, the term "a plurality of" refers to two or more, unless otherwise specified.

In the description of the embodiments of the present disclosure, unless otherwise unambiguously specified and defined, terms like "mounting", "coupling", "connecting" and "fixing" should be construed in broad sense, for example, it may be fixed connection, or detachable connection, or integral connection; or may also be mechanical connection or electrical connection; or may also be direct connection, or indirect connection through an intermediate medium; or may also be internal communication between two components. It will be understood by those ordinarily skilled in the art that the specific meanings of the above terms in the embodiments of the present disclosure can be understood according to specific circumstances.

An embodiment of the present disclosure provides a head-up display system, which controls an exit angle of light by concentrating and diffusing the light, thereby improving imaging brightness of the head-up display system. Referring to FIG. 1, the head-up display system includes: a light source 10, a collimator element 20, a direction controller element 30, a first diffuser element 41, a liquid crystal panel 50, and a transflective reflection device for displaying 60. As shown in FIG. 1, the direction controller element 30, the first diffuser element 41 and the liquid crystal panel 50 are arranged on a same side of the light source 10 in a stacked manner.

In an embodiment of the present disclosure, the light source 10 may emit light; and the collimator element 20 is configured to adjust an exit direction of the light emitted by the light source 10 to be at an angle within a preset angle range, to collimate the light emitted by the light source 10. The direction controller element 30 is configured to concentrate the light emitted by the light source 10; and the first diffuser element 41 is configured to diffuse the light emitted by the light source 10. The liquid crystal panel 50 is configured to convert the light emitted by the light source 10 into imaging light, and allow the imaging light to be incident to the reflection device for displaying 60; and the reflection device for displaying 60 is configured to reflect the imaging light to a preset region 200, so that an observer (e.g., a driver, or a passenger, etc.) may view the image formed by the liquid crystal panel 50, when his/her eyes are located in the preset region 200. That is, the light emitted by the light source reaches the preset region after reaching the collimator element, a light concentrator element, the first diffuser element, the liquid crystal panel and the reflection device for displaying to. According to this embodiment, the imaging light is light emitted by the liquid crystal panel 50; the imaging light essentially comes from the light emitted by the light source 10; each pixel of the liquid crystal panel 50 may be controlled as to whether to transmit the light emitted by the light source 10, so that the observer may view the image formed by the liquid crystal panel 50 when seeing the light passing through the liquid crystal panel 50 (i.e., the imaging light); and the content of the image formed by the liquid crystal panel 50 is the content of the HUD image that can be viewed by the observer.

In an embodiment of the present disclosure, since the light source 10 is generally a point light source, that is, the light emitted by the light source 10 is emitted at various angles; according to this embodiment, the exit direction of the light emitted by the light source 10 may be adjusted into the preset angle range through the collimator element 20, so as to collimate a light propagation direction.

Assuming that the first diffuser element 41 is removed from an optical path from the light source to the preset region, the light directly or indirectly emitted by the light source 10 may be concentrated by the direction controller element 30 and then reaches a preset position 100. The preset position 100 is located within the preset region; and an area of the preset position is smaller than an area of the preset region. For example, the light directly emitted by the light source 10 refers to: the light which is emitted by the light source 10 and is directly incident to the direction controller element 30; and the light indirectly emitted by the light source 10 refers to: the light which is emitted by the light source and is incident to the direction controller element 30 after reaching other component (e.g., the collimator element 20, or the first diffuser element 41, etc.). In this embodiment, by providing the direction controller element 30, the light may be concentrated to the preset position 100; the concentrated light is used as backlight for the liquid crystal panel 50, so that the light may be used for imaging, and further the observer whose eye is at the preset position 100 where the light is converged can observe a complete image; because the light is concentrated, the imaging brightness is higher, and the observer may view an image with higher brightness. Optionally, the collimator element 20 is configured to adjust the light emitted by the light source 10 to parallel light or approximately parallel light, so as to facilitate the direction controller element 30 to uniformly adjust the exit direction of the collimated parallel light. Optionally, the direction controller element 30 includes one or more selected from the group consisting of a convex lens, a concave lens, a Fresnel lens, or a combination thereof. That is, for example, the direction controller element 30 is, illustratively, a Fresnel lens, or may also be a convex lens, or may also be a combination of lenses (e.g., a combination of a convex lens and a concave lens, or a combination of a Fresnel lens and a convex lens, etc.).

Also, in order to expand an imaging range to increase the region for the observer to view the image, in an embodiment of the present disclosure, the light emitted by the light source 10 is diffused based on the first diffuser element 41, so that the light after diffusion may reach a preset observation range (the preset region) 200. For example, the first diffuser element 41 may diffuse the light directly or indirectly emitted by the light source 10; in this case, the light directly emitted by the light source 10 refers to: the light emitted by the light source 10 and directly incident to the first diffuser element 41, and the light indirectly emitted by the light source 10 refers to: the light emitted by the light source and incident to the first diffuser element 41 after reaching other component (e.g., the collimator element 20, or the direction controller element 30, etc.).

In this embodiment, the light emitted by the light source 10 is concentrated and diffused by the direction controller element 30 and the first diffuser element 41, and the concentrated and diffused light serves as the backlight for the liquid crystal panel 50, so that the liquid crystal panel 50 can image normally, and the imaging light during imaging is reflected by the reflection device for displaying 60 and then reaches the preset position 100, so that the observer whose eye is located at the preset position 100 may view the image formed by the liquid crystal panel 50, and in this case, the image viewed by the observer is a virtual image 300 formed by the reflection device for displaying 60 by means of reflection imaging; and, under an action of the first diffuser element 41, for example, the imaging light is diffused and then reaches the observation range 200, so that the observer may view the image formed by the liquid crystal panel 50 when the eyes are located at any position within the observation range 200. For example, the preset position 100 is a position within the observation range 200. For example, the observer may be a driver or a passenger; in this case, a region where the observer needs to view the imaging, that is, an eyebox region, may be preset according to actual needs; and the eyebox region refers to a region where the observer's eyes are located and can see the HUD image. In this case, it is only necessary that the above-described observation range 200 may cover the eyebox region, and for example, a center of the eyebox region is set as the preset position 100. In this embodiment, the eyebox region has a certain size; even if the observer's eyes deviate from the center of the eyebox region by a certain distance, for example, move up and down, left and right by a certain distance, the observer will still see the HUD image as long as the observer's eyes are still located within the eyebox region.

Figure 2:
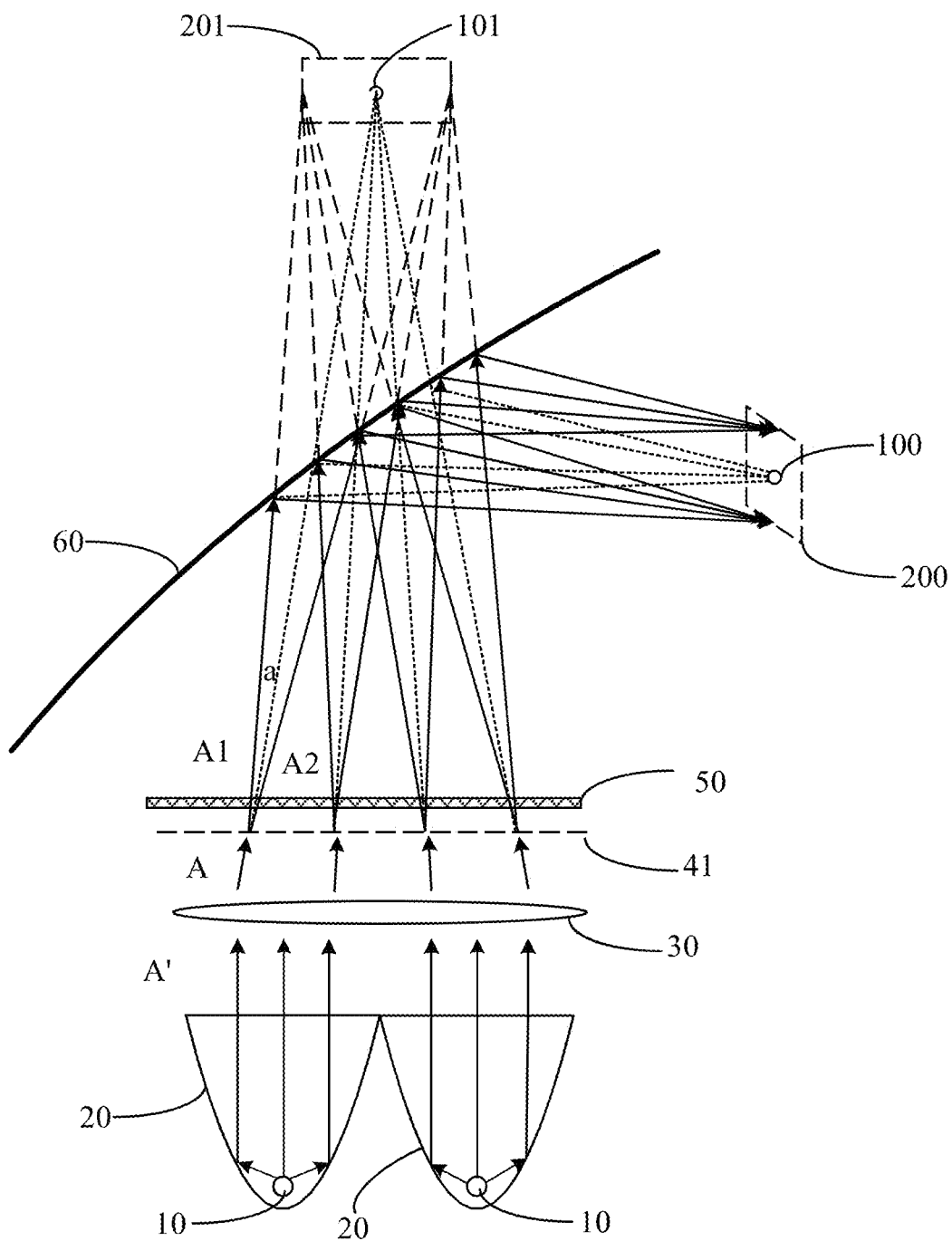
FIG. 2 shows a schematic diagram of an imaging principle of a head-up display system provided by an embodiment of the present disclosure.

For example, for a working principle of the head-up display system, FIG. 2 may be referred to; for convenience of description, in FIG. 2, the reflection device for displaying 60 being planar is taken as an example to illustrate. As shown in FIG. 2, the collimator element 20 collimates the light emitted by the light source 10; it is illustrated in FIG. 2 by taking the collimated light as parallel light, and the parallel light may be adjusted to the light required for imaging after passing through the direction controller element 30 and the first diffuser element 41. It is illustrated in FIG. 2 by taking leftmost light A' as an example, the light A' is adjusted to light A toward the preset position 100 after passing through the direction controller element 30, and due to the presence of the reflection device for displaying 60, the light A is actually toward a mirror position 101 of the preset position 100; if there is no first diffuser element 41, the light A may travel toward the preset position 100 along the optical path a after being reflected by the reflection device for displaying 60; in a case that the first diffuser element 41 exists, the first diffuser element 41 diffuses the light A into light with a plurality of exit angles (e.g., light A1, light A2, etc. in FIG. 2); diffused light may be spread into a range, that is, the observation range 200, after being reflected by the reflection device for displaying 60, so that when the observer's eye is within the observation range 200, the observer can always view the image formed by the liquid crystal panel 50. Similarly, the diffused light A1, light A2, etc. are directly toward the mirror range 201 of the observation range 200. In addition, in practical applications, for example, the reflection device for displaying 60 has a certain curvature, an imaging principle thereof is similar to that shown in FIG. 2, and no details will be repeated here. Those skilled in the art can understand that, for example, a curved reflection device for displaying 60 is a windshield, when viewed in different positions, a position of the virtual image 300 is not fixed; so when the reflection device for displaying 60 is a curved windshield or imaging window, the virtual image 300 in this embodiment refers to the virtual image 300 that may be seen when observed from the preset position 100, that is, the position of the virtual image 300 is the position of the virtual image when the observer observes from the preset position 100.

For example, the first diffuser element 41 may be a low-cost scattering optical element, for example, a homogenizer, or a diffuser, etc. Or, for example, the first diffuser element 41 is a diffractive optical element (DOE) with better control of the diffusion effect, for example, a beam shaper, etc. For example, light is scattered when passing through the scattering optical element, for example, the homogenizer; the light after passing through the scattering optical element is in many different angles, and a small amount of diffraction also occurs; and, scattering of light plays a major role and a formed spot is relatively large. The diffractive optical element has certain microstructures designed at a surface thereof, and plays a role in light beam expansion mainly through diffraction, leading to a smaller light spot, a size and a shape of the light spot being controllable.

Figure 3A:
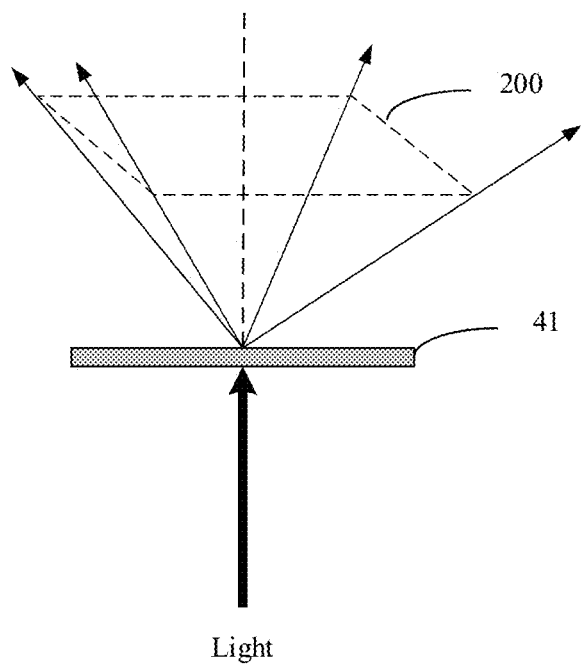
FIG. 3a shows a schematic diagram of a principle of a diffuser element in a head-up display system provided by an embodiment of the present disclosure.

In this embodiment, after passing through the first diffuser element 41, the light is transformed into a light beam, whose cross section in a direction perpendicular to the propagation direction of main chief light has a specific shape, that is, the first diffuser element 41 may diffract light passing through it and the light diffracted by the first diffuser element 41 forms the observation range 200 with a certain shape; and a size and a shape of the observation range 200 formed by diffraction are mainly determined by the microstructures of the first diffuser element 41. Optionally, the shape of the observation range 200 includes, but is not limited to, a circle, an ellipse, a square, or a rectangle. As shown in FIG. 3*a*, after the light passes through the first diffuser element 41 which is illustratively a diffractive optical element, the light is diffused and forms a certain cross-sectional shape; the cross-sectional shape corresponds to the shape of the observation range 200; FIG. 3*a* takes the observation range 200 being a rectangle as an example to illustrate; and the above-described FIG. 2 also takes the observation range 200 being a rectangle as an example to illustrate.

Figure 3B:
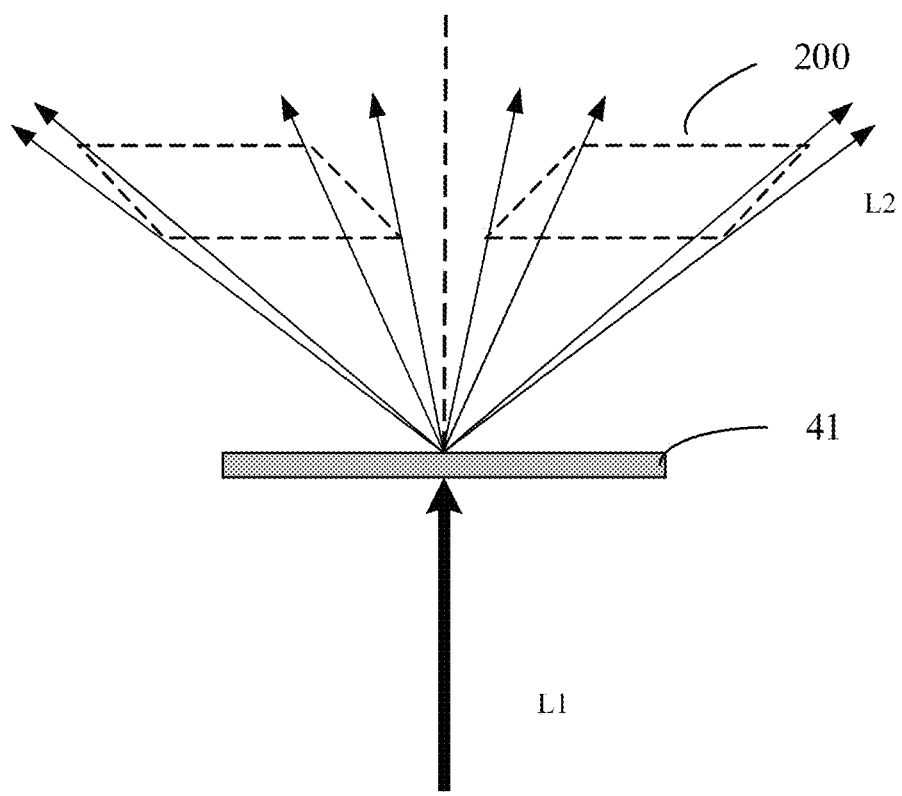
FIG. 3b shows a schematic diagram of another diffuser element in a head-up display system provided by an embodiment of the present disclosure.

Further, for example, the first diffuser element 41 is a diffuser element of a discrete type, that is, for example, the first diffuser element 41 diffuses the light passing through it to a plurality of ranges; and a shape of each range includes, but is not limited to, a circle, an ellipse, a square, or a rectangle. As shown in FIG. 3*b*, after passing through the first diffuser element 41 of the discrete type, for example, the light is diffused to a plurality of regions, each region corresponds to an observation range 200; and in FIG. 3*b*, it is illustrated by taking that the light is diffused to two rectangular regions as an example. FIG. 3*b* shows light L1 incident to the first diffuser element 41 and light L2 after being diffused by the first diffuser element 41.

In addition, optionally, in order to better achieve a concentration effect, the preset position 100 corresponds to a focal point of the direction controller element 30. In this embodiment, a distance between the direction controller element 30 and the mirror position 101 is a focal length of the direction controller element 30. For example, the mirror position 101 is a position of the virtual image formed by the preset position 100 through the reflection device for displaying 60, for which FIG. 4 may be specifically referred to.

Figure 4:
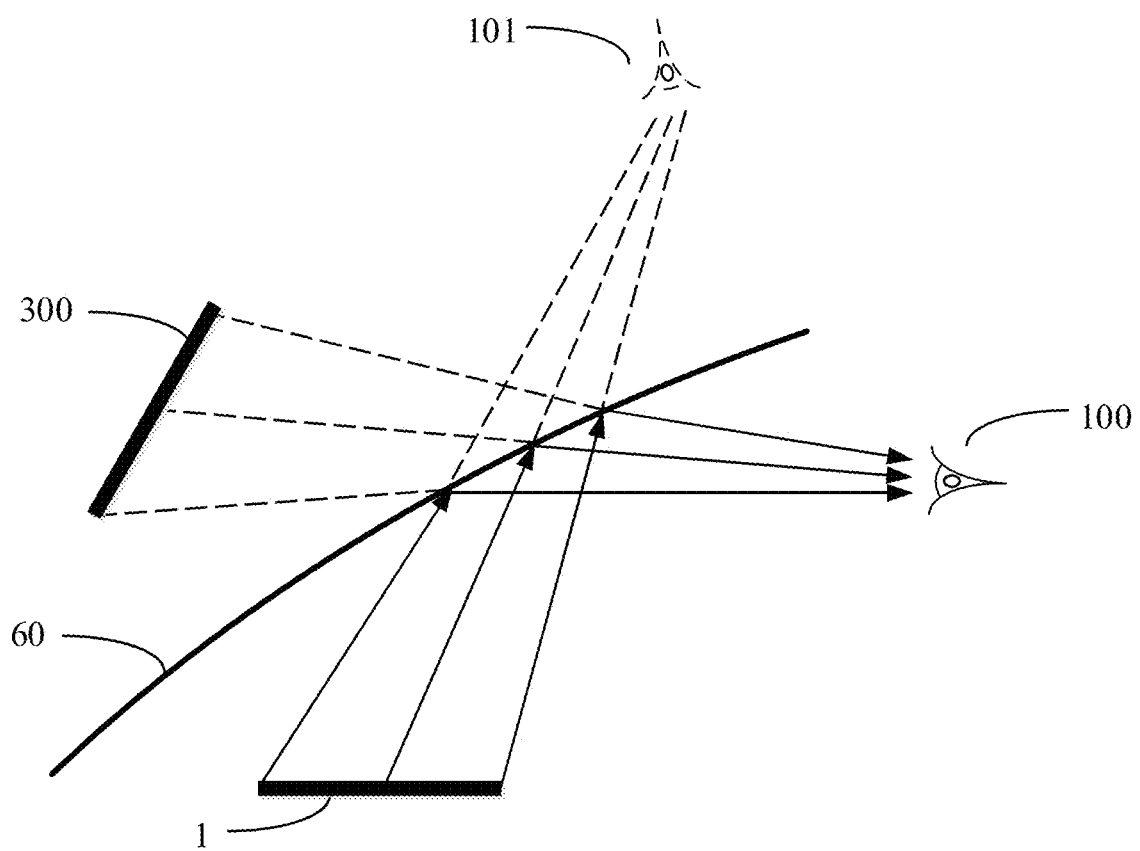
FIG. 4 shows an imaging schematic diagram of a reflection device for displaying in a head-up display system provided by an embodiment of the present disclosure.

In an embodiment of the present disclosure, except the reflection device for displaying 60, the light source 10, the collimator element 20, the direction controller element 30, the first diffuser element 41 and the liquid crystal panel 50, etc. for example form an image source 1 of the head-up display system, that is, the image source 1 includes the light source 10, the collimator element 20, the direction controller element 30, the first diffuser element 41 and the liquid crystal panel 50, etc. As shown in FIG. 4, the imaging light emitted by the image source 1 (i.e., the imaging light emitted by the liquid crystal panel 50) is reflected by the reflection device for displaying 60 and then reaches the preset position 100, so that the observer whose eyes are located at the preset position 100 can view the virtual image 300 formed by the reflection device for displaying 60; meanwhile, with respect to an object in the preset position 100, a virtual image of the object may also be formed on the other side of the reflection device for displaying 60, and a position of the virtual image of the object is just the mirror position 101. And, because the reflection device for displaying 60 is not necessarily planar, the "distance between the direction controller element 30 and the mirror position 101" in this embodiment specifically refers to an optical path distance when the light is incident from the direction controller element 30 to the mirror position 101.

For example, the head-up display system is installed on a transportation means such as a vehicle; for example, the reflection device for displaying 60 in the embodiment is a windshield of the vehicle or a film attached to the windshield; and the reflection device for displaying 60 has a transflective characteristic, which allows the imaging light emitted by the liquid crystal panel 50 to be reflected by the reflection device for displaying 60 to the preset position 100; meanwhile, the light from outside the vehicle may also pass through the reflection device for displaying 60 and reach the preset position 100, so that the observer in the preset position 100 can also view a scene outside the vehicle normally. For example, the "transflective characteristic" in this embodiment refers to that the reflection device for displaying 60 can transmit light and can also reflect light, and it is not limited to transmit 50% of the light and reflect 50% of the light.

Optionally, when the head-up display system is installed on a transportation means such as a vehicle, for example, the first diffuser element 41 of the discrete type is adopted, that is, for example, the first diffuser element 41 diffuse the light emitted by the light source 10 to a plurality of observation ranges 200. For example, the first diffuser element 41 diffuses the light emitted by the light source 10 to two observation ranges 200, and the two observation ranges 200 respectively correspond to a driver and a co-pilot passenger, so that both the driver and the co-pilot passenger may view the image formed by the liquid crystal panel 50, which can minimize light loss and improve the light utilization rate.

In the head-up display system provided by the embodiment of the present disclosure, the direction controller element 30 and the first diffuser element 41 respectively concentrate and diffuse light, so that the light emitted by the light source 10 can be effectively restricted in the observation range 200, and the observer can normally view the image formed by the liquid crystal panel 50 through the reflection of the reflection device for displaying 60 in the observation range 200; most or all of the light from the light source 10 may be converged in the observation range 200 by means of concentrating and diffusing, which can improve brightness during imaging, and improve the light utilization rate, so that the light source 10 can ensure imaging brightness even at a lower power, so as to reduce power consumption of the head-up display system, and reduce heat generation. Even if a large-area liquid crystal panel 50 needs to be provided for large-sized imaging, in this case, the increased power consumption is small, that is, the head-up display system is also suitable for large-area imaging Also, collimating the light emitted by the light source 10 based on the collimator element 20 facilitates the direction controller element 30 and the first diffuser element 41 to more effectively concentrate and diffuse the light, and facilitates control of light.

Figure 5:
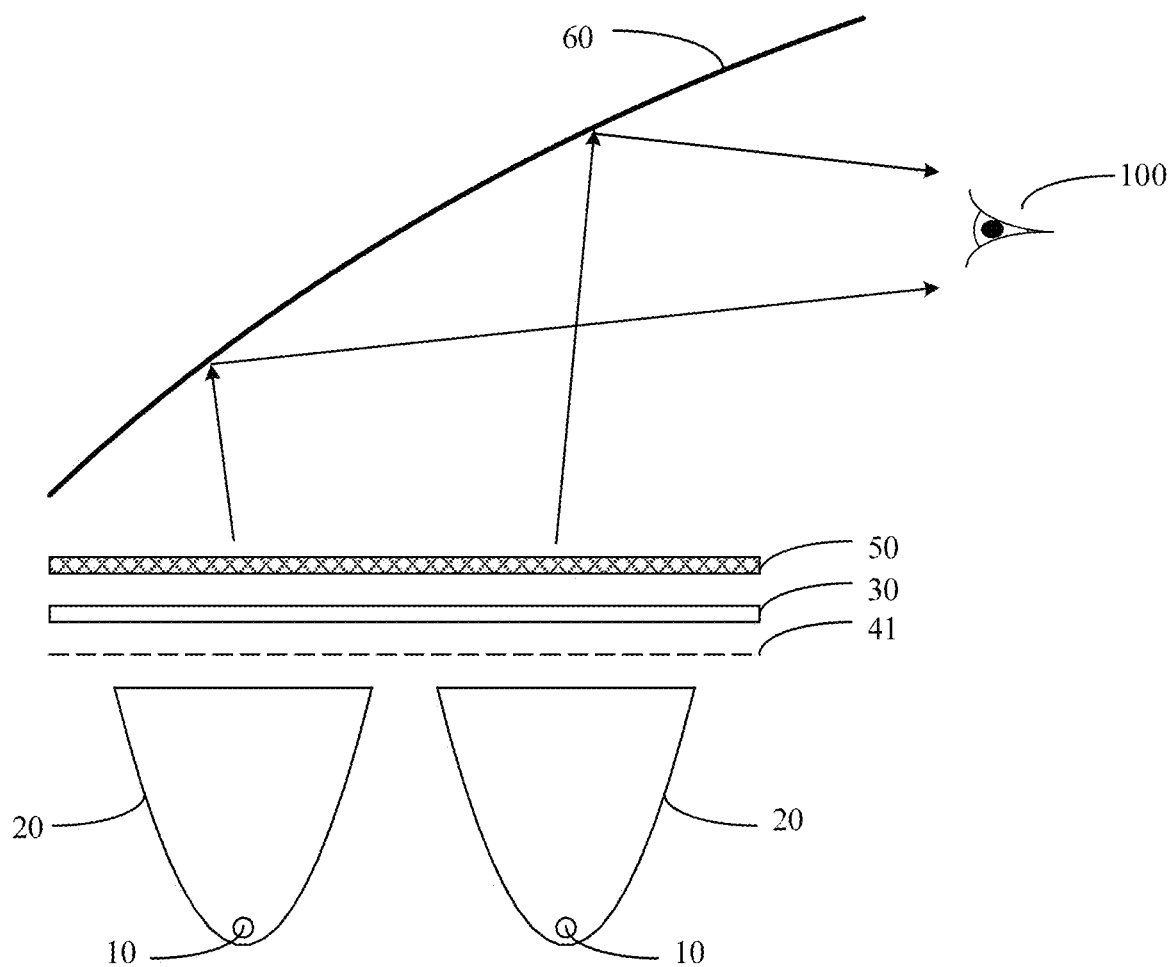
FIG. 5 shows a second structural schematic diagram of a head-up display system provided by an embodiment of the present disclosure.
Figure 6:
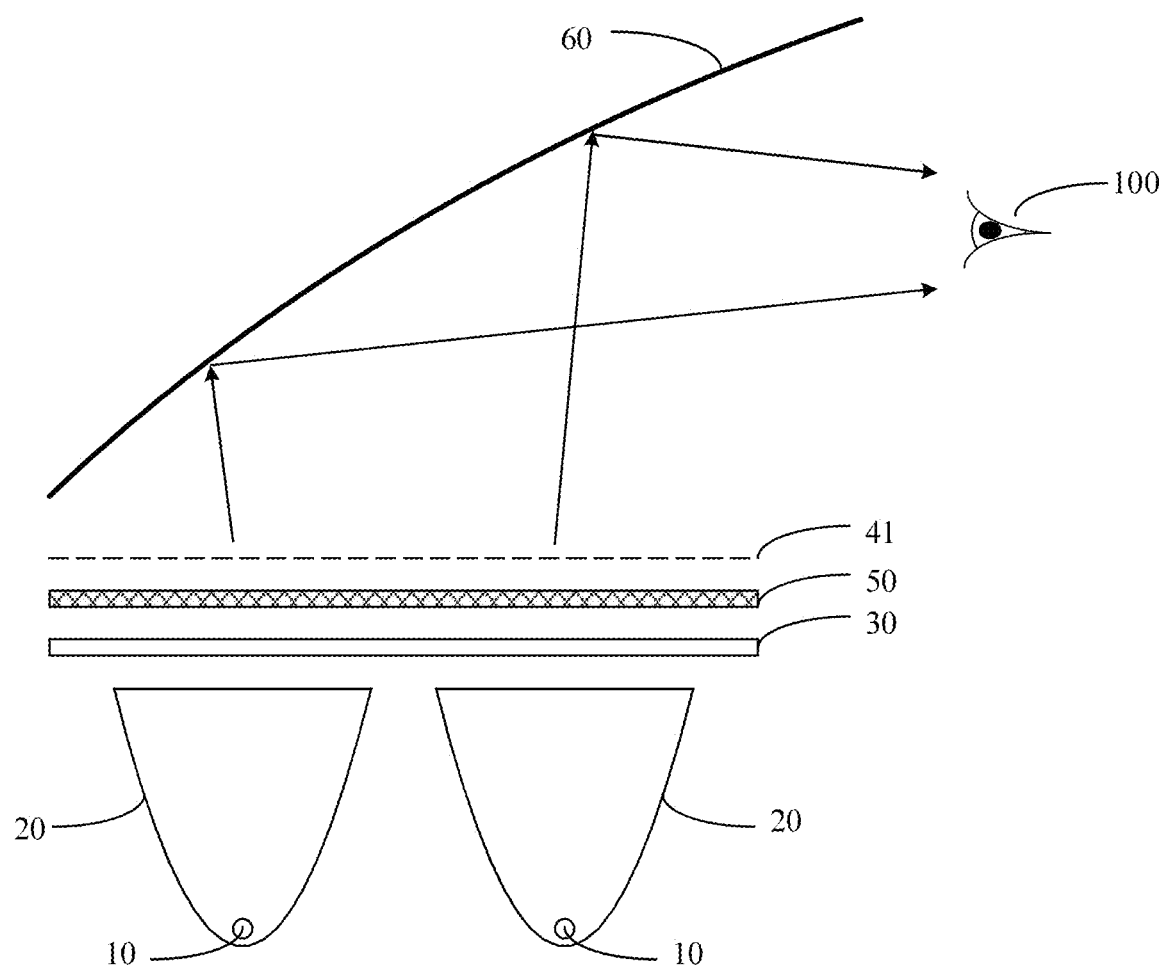
FIG. 6 shows a third structural schematic diagram of a head-up display system provided by an embodiment of the present disclosure.

On the basis of the above-described embodiments, the direction controller element 30, the first diffuser element 41, and the liquid crystal panel 50 may be arranged in a variety of stacked manners. As shown in FIG. 1, the direction controller element 30, the first diffuser element 41, and the liquid crystal panel 50 are sequentially stacked along the exit direction of the light of the light source 10, that is, the light from the light source 10 is firstly concentrated and then diffused, and then used as backlight for imaging. Or, as shown in FIG. 5, the first diffuser element 41, the direction controller element 30, and the liquid crystal panel 50 are sequentially stacked along the exit direction of the light from the light source 10, that is, the light from the light source 10 is firstly diffused and then concentrated, and then used as backlight for imaging. Or, as shown in FIG. 6, the direction controller element 30, the liquid crystal panel 50, and the first diffuser element 41 are sequentially stacked along the exit direction of the light from the light source 10, that is, the light from the light source 10 is firstly concentrated, then directly used as backlight for imaging, and finally the imaging light is diffused. Other stacked manners may be used, and no details will be repeated here.

For example, in order to control light more conveniently, in general, for example, the mode of concentrating firstly and then diffusing is adopted, that is, the light source 10 and the first diffuser element 41 are respectively arranged on two sides of the direction controller element 30, and the first diffuser element 41 is configured to diffuse the light concentrated by the direction controller element 30; for the specific structure, FIG. 1 or FIG. 6 may be referred to. In addition, in order to reduce influence on imaging of the liquid crystal panel 50, the first diffuser element 41 is arranged between the light source 10 and the liquid crystal panel 50, as shown in FIG. 1. Also, for example, the light is collimated by the collimator element 20 firstly, and then concentrated and diffused, that is, the direction controller element 30 and the first diffuser element 41 are arranged on the same side of the collimator element 20. In this embodiment, the direction controller element 30 is arranged between the collimator element 20 and the first diffuser element 41; and the direction controller element 30 is configured to concentrate the collimated light and emit the concentrated light to the first diffuser element 41.

Figure 7A:
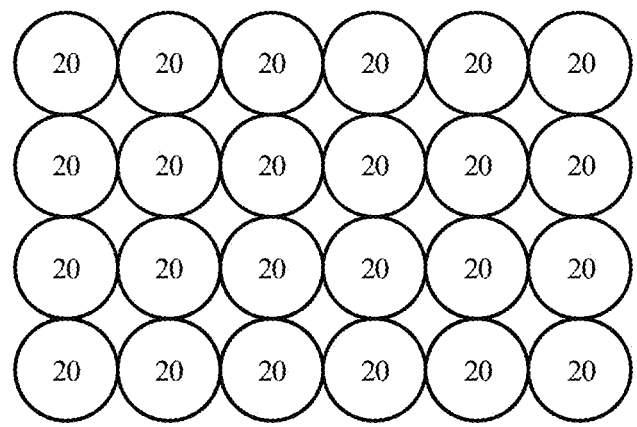
FIG. 7a shows a first arrangement schematic diagram of collimator elements provided by an embodiment of the present disclosure.
Figure 7B:
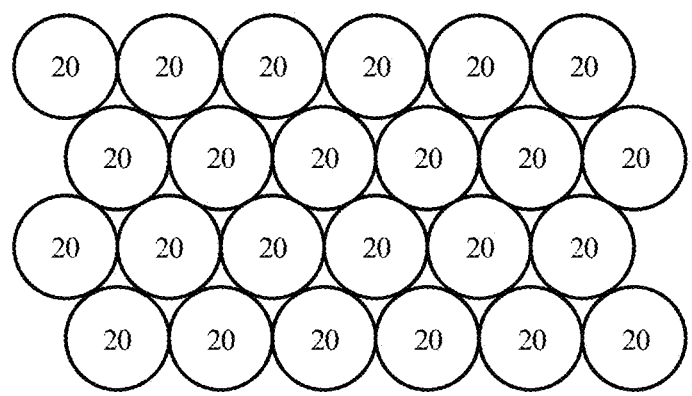
FIG. 7b shows a second arrangement schematic diagram of collimator elements provided by an embodiment of the present disclosure.

On the basis of the above-described embodiments, for example, the head-up display system is provided with a plurality of collimator elements 20; and each collimator element 20 is provided therein with one or more light sources 10. For example, a plurality of light sources 10 may be arranged in a matrix into a light source point array, for example, 4 light sources 10 may be arranged in a 2×2 point array; or, a plurality of light sources 10 may also be arranged in a linear array, for example, 4 light sources 10 may be arranged in a 1×4 array. The collimator element 20 can collimate the light emitted by the light source 10 in the collimator element 20; and, for example, the plurality of collimator elements 20 are arranged in a closely-packed manner to avoid a case where some regions cannot form backlight. For example, as shown in FIG. 7a and FIG. 7b, a shape of the collimator element 20 is circular, and a plurality of collimator elements 20 are arranged in a closely-packed manner. For example, the "shape of the collimator element" in this embodiment refers to an outer contour shape of a cross-section of the collimator element 20. FIG. 1 is a side view of the head-up display system; and FIG. 7a and FIG. 7b are schematic diagrams of arrangement of the collimator elements 20 along a top view direction.

Figures 8A, 8B:
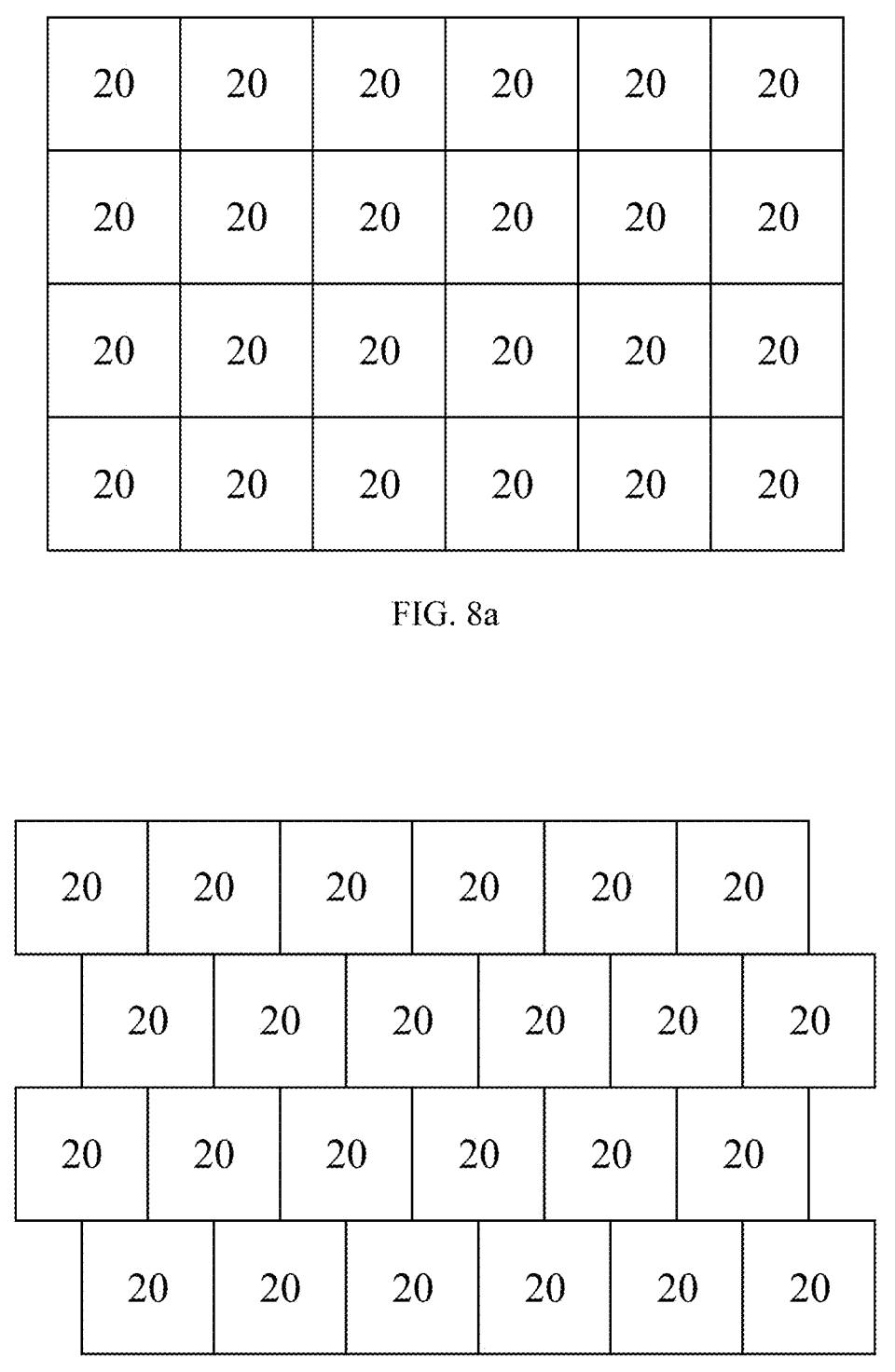
Figure 9:
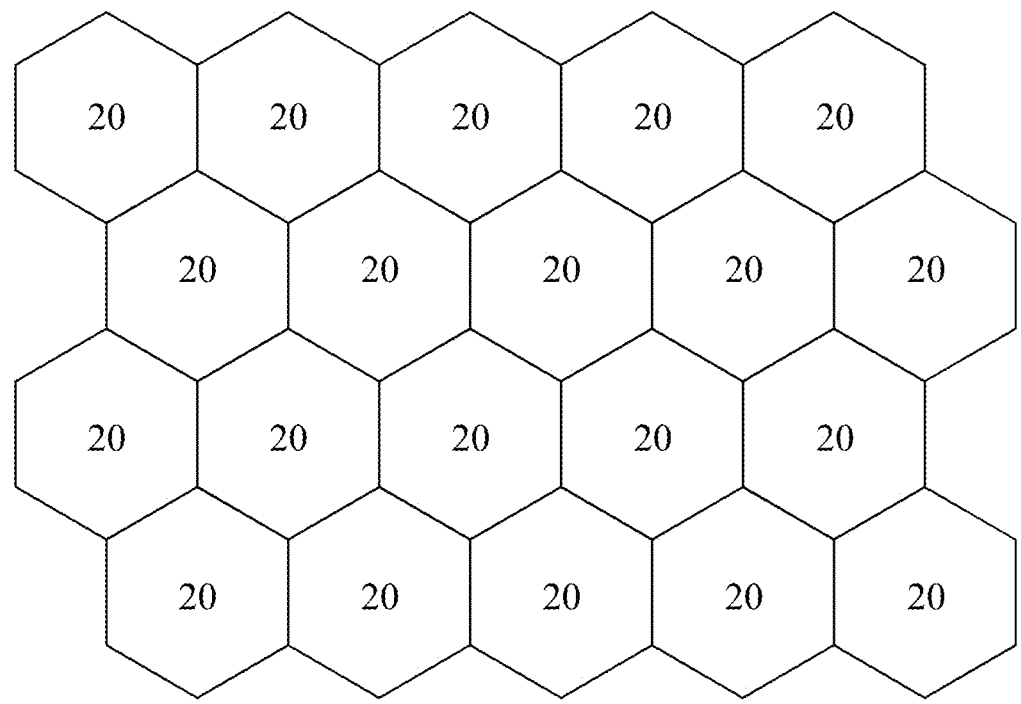
FIG. 9 shows a fifth arrangement schematic diagram of collimator elements provided by an embodiment of the present disclosure.

Because the light source 10 is generally a point light source, the circular collimator element 20 can make most efficient use of the light emitted by the light source 10 and improve the light utilization rate. Also, when the circular collimator elements 20 are closely arranged, there is a gap between two collimator elements 20, thereby reducing a space utilization rate. In order to balance the light utilization rate and the space utilization rate, for example, the collimator elements 20 are arranged in a completely closely-packed manner. The "completely closely-packed manner" in this embodiment refers to that there may be no gaps between collimator elements 20 after the collimator elements 20 being closely packed. For example, when the shape of the collimator element 20 is a quadrilateral (e.g., a rhombus, a rectangle, etc.) or a hexagon (preferably a regular hexagon), completely closely-packed arrangement is implemented. Referring to FIG. 8a and FIG. 8b, a shape of the collimator element 20 is rectangular, and a plurality of collimator elements 20 are arranged in a completely closely-packed manner. FIG. 8a and FIG. 8b show two completely closely-packed manners of the rectangular collimator elements 20. Or, referring to FIG. 9, a shape of the collimator element 20 is a regular hexagon, and a plurality of collimator elements 20 are arranged in a completely closely-packed manner.

Figure 10A:
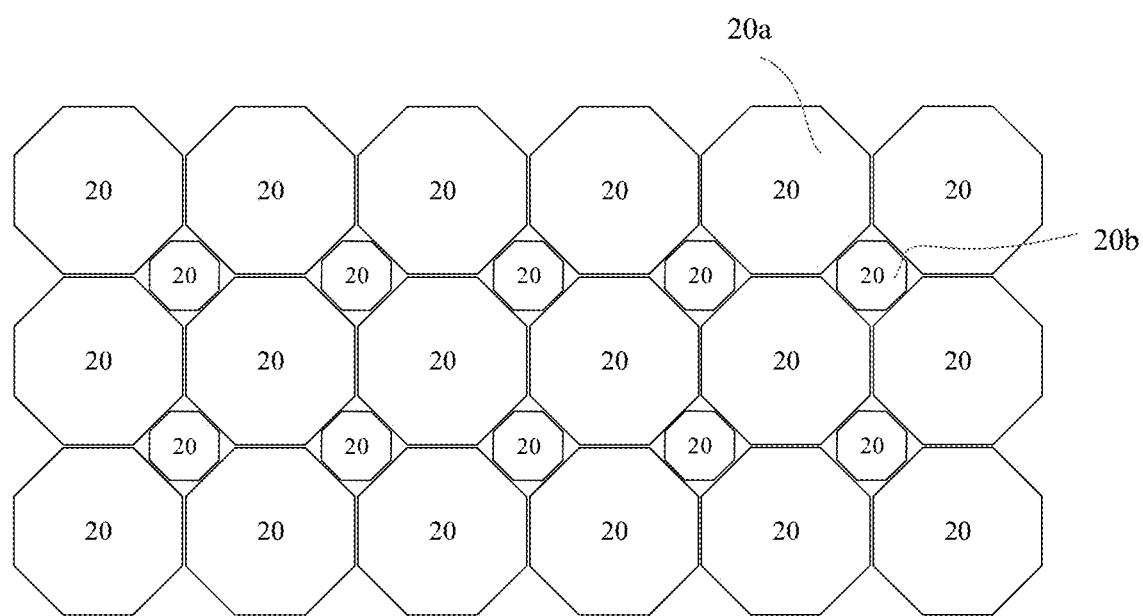
FIG. 10a shows a sixth arrangement schematic diagram of collimator elements provided by an embodiment of the present disclosure.
Figure 10B:
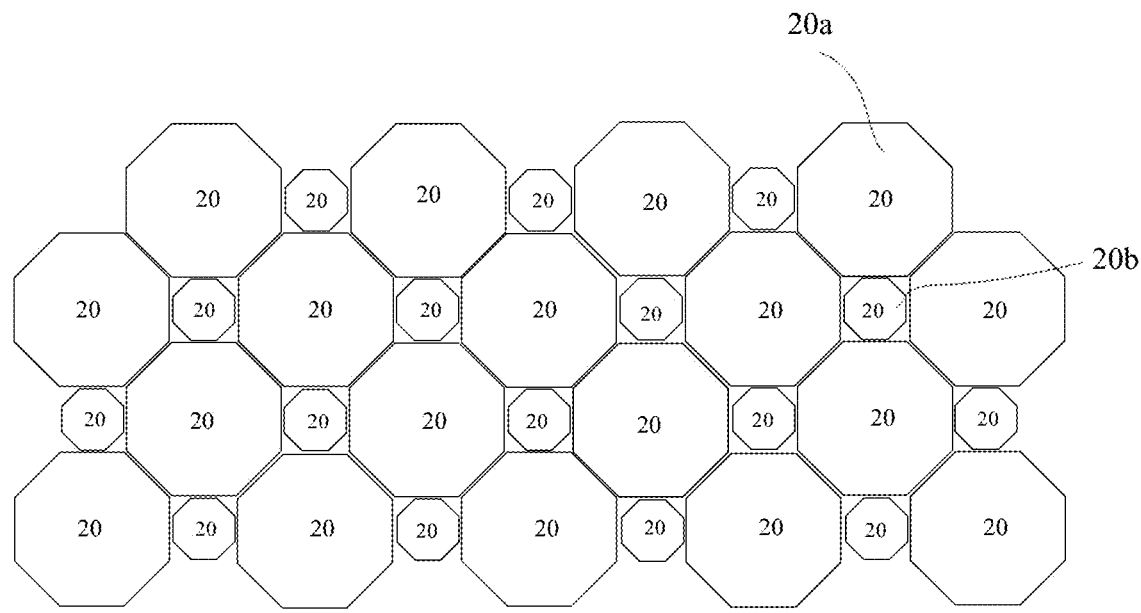
FIG. 10b shows a seventh arrangement schematic diagram of collimator elements provided by an embodiment of the present disclosure.

For example, the regular hexagonal arrangement improves the space utilization rate, it also slightly reduces the light utilization rate. Optionally, a shape of a collimator element 20 is an octagon (e.g., a regular octagon), and a plurality of collimator elements 20 are arranged in a completely closely-packed manner. Furthermore, because octagons cannot be completely closely packed, for example, small light sources are used to fill the gaps. For example, as shown in FIG. 10a and FIG. 10b, a sub-collimator element whose size matches the gap is additionally provided in the gap between the plurality of collimator elements 20. For example, the sub-collimator element may be of any shape, and it is illustrated in the diagram by taking the sub-collimator element being also an octagon as an example. Because the octagon is closer to a circle than a hexagon, the light utilization rate is higher, and the space utilization rate is also higher than that of an array arranged in a circle.

As shown in FIG. 10a and FIG. 10b, a large octagon represents a collimator element 20a, and a small octagon represents a sub-collimator element 20b. As shown in FIG. 10a and FIG. 10b, in order to make better use of space, one sub-collimator element 20b is arranged within a gap formed by four collimator elements 20a; each two adjacent collimator elements 20a among the four collimator elements 20a are in contact with each other, and the sub-collimator element 20b located in the gap is in contact with the four collimator elements 20a. For example, a light source is provided for each sub-collimator element 20b, and a light source is provided for each collimator element 20a. The collimator element 20a represented by the large octagon may be referred to as a first collimator element, and the sub-collimator element 20b represented by the small octagon may be referred to as a second collimator element.

Figure 11:
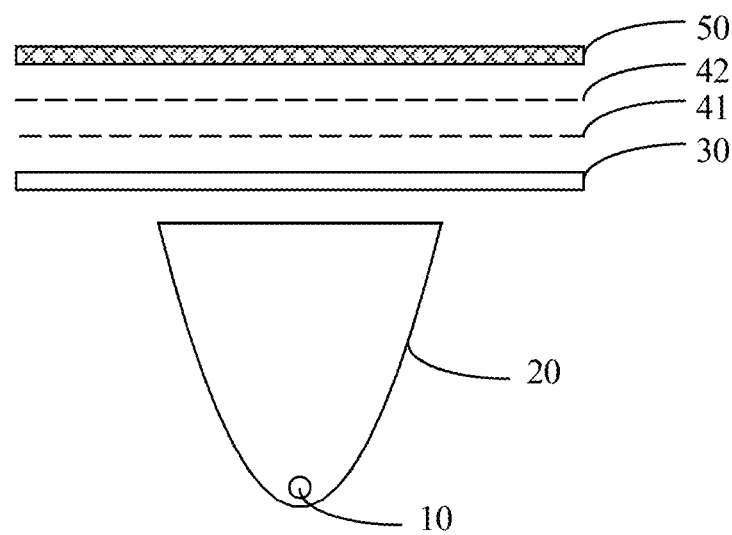
FIG. 11 shows a first structural schematic diagram of an image source in a head-up display system provided by an embodiment of the present disclosure.

On the basis of the above-described embodiments, for example, the collimator element 20 collimates the light emitted by the light source 10, and it may not implement perfect collimation in actual situations, resulting in relatively weak brightness at an edge of the collimator element 20. For example, when a plurality of collimator elements 20 are arranged in a closely-packed manner, a gap between collimator elements 20 is easily to form a dark light region. In this embodiment, a plurality of diffuser elements are arranged at intervals to uniform light brightness. As shown in FIG. 11, the head-up display system further includes a second diffuser element 42; the first diffuser element 41 and the second diffuser element 42 are stacked, and the first diffuser element 41 and the second diffuser element 42 are separated by a preset distance.

In an embodiment of the present disclosure, both the first diffuser element 41 and the second diffuser element 42 can diffuse the light emitted by the light source 10; and, the first diffuser element 41 and the second diffuser element 42 can uniform the light collimated by the collimator element 20, so that the imaging brightness of the liquid crystal panel 50 is more uniform. For example, each of the first diffuser element 41 and the second diffuser element 42 is essentially a kind of diffuser element, and for example, the diffuser element is illustratively a diffractive optical element (DOE), for example, a beam shaper, etc.; a size and a shape of the observation range 200 formed by diffraction are determined by the microstructure of the beam shaper. Or, for example, the diffuser element is a scattering optical element such as a homogenizer, or a diffuser, etc. For a specific structure of the scattering optical element, related description of the above-described first diffuser element 41 may be referred to, and no details will be repeated here.

In this embodiment, the head-up display system uses a plurality of diffuser elements (including the first diffuser element 41 and the second diffuser element 42) arranged at intervals, which not only diffuses light, but also uniforms light brightness, to ensure uniform imaging brightness of the liquid crystal panel 50.

Figure 12:
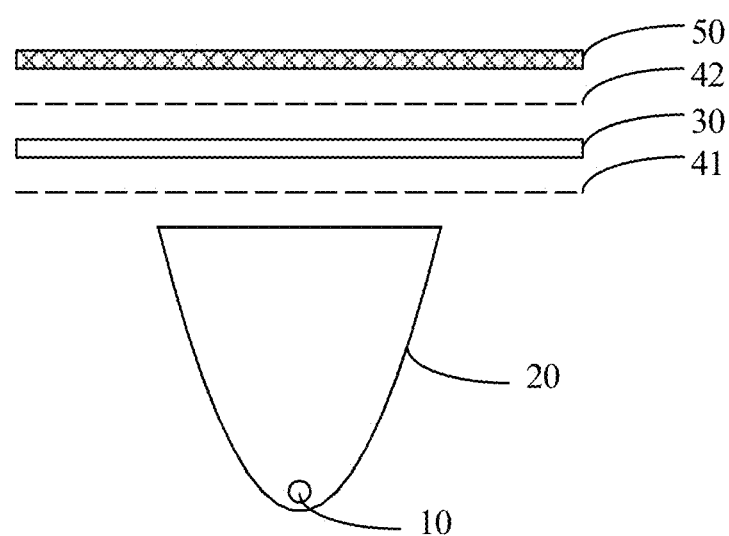
FIG. 12 shows a second structural schematic diagram of an image source in a head-up display system provided by an embodiment of the present disclosure.

Also, in order that a plurality of diffuser elements can all play a corresponding role, there is a preset distance between adjacent diffuser elements; and for example, the preset distance is illustratively 40 mm to 50 mm. In addition, for example, the plurality of diffuser elements in this embodiment are all arranged on the same side of the direction controller element 30; as shown in FIG. 11, the first diffuser element 41 and the second diffuser element 42 are both arranged on a side of the direction controller element 30 that is close to the liquid crystal panel 50. Or, when a thickness of the direction controller element 30 is not greater than the preset distance, for example, the diffuser elements are dispersedly arranged on two sides of the direction controller element 30 to reduce an overall thickness of the image source 1. As shown in FIG. 12, the first diffuser element 41 and the second diffuser element 42 are respectively arranged on two sides of the direction controller element 30.

On the basis of the above-described embodiments, in order to improve concentrating and diffusing effects of the direction controller element 30 and the first diffuser element 41, in this embodiment, the light emitted by the light source 10 is firstly collimated, that is, the light source 10 and the collimator element 20 are arranged on the same side of the direction controller element 30 (or the first diffuser element 41); and, the collimator element 20 is partially or entirely arranged between the light source 10 and the direction controller element 30; and the collimator element 20 is configured to emit adjusted light to the direction controller element 30.

In this embodiment, for example, the collimator element 20 includes a collimating lens 21 and/or a collimating film; and the collimating lens 21 and/or the collimating film are/is arranged between the light source 10 and the direction controller element 30. For example, the collimating lens 21 includes one or more of a convex lens, a concave lens, a Fresnel lens, or a combination thereof (e.g., a combination of a convex lens and a concave lens, or a combination of a Fresnel lens and a concave lens, etc.). For example, the collimating film is a brightness enhancement film (BEF), which is used to adjust an exit direction of light to a preset angle range, for example, to concentrate the light within an angle range of −35° to +35° from a normal of the collimating film. In addition, for example, the light source 10 is provided at a focal point of the collimating lens 21, that is, a distance between the collimating lens 21 and a position of the light source 10 is equal to a focal length of the collimating lens 21, so that light of different directions from the light source 10 can be emitted in parallel after passing through the collimating lens 21, as shown in FIG. 13.

In this embodiment, if the collimator element 20 only includes the collimating lens 21 and/or the collimating film, for example, the collimator element 20 is entirely located between the light source 10 and the direction controller element 30. Or, the collimator element 20 adjusts the exit direction of the light from the light source 10 through reflection. For example, the collimator element 20 is provided with a reflective surface that can reflect the light emitted by the light source 10, and by setting the curvature of the reflective surface, a reflection angle of the light can be adjusted, so that the exit direction of the light emitted by the light source 10 may be constrained within a preset angle range, even to adjust the light of the light source 10 to parallel light. For example, the reflective surface may be implemented by using a lamp cup structure, for example, it may be an inner reflective surface of a hollow lamp cup.

Figure 13:
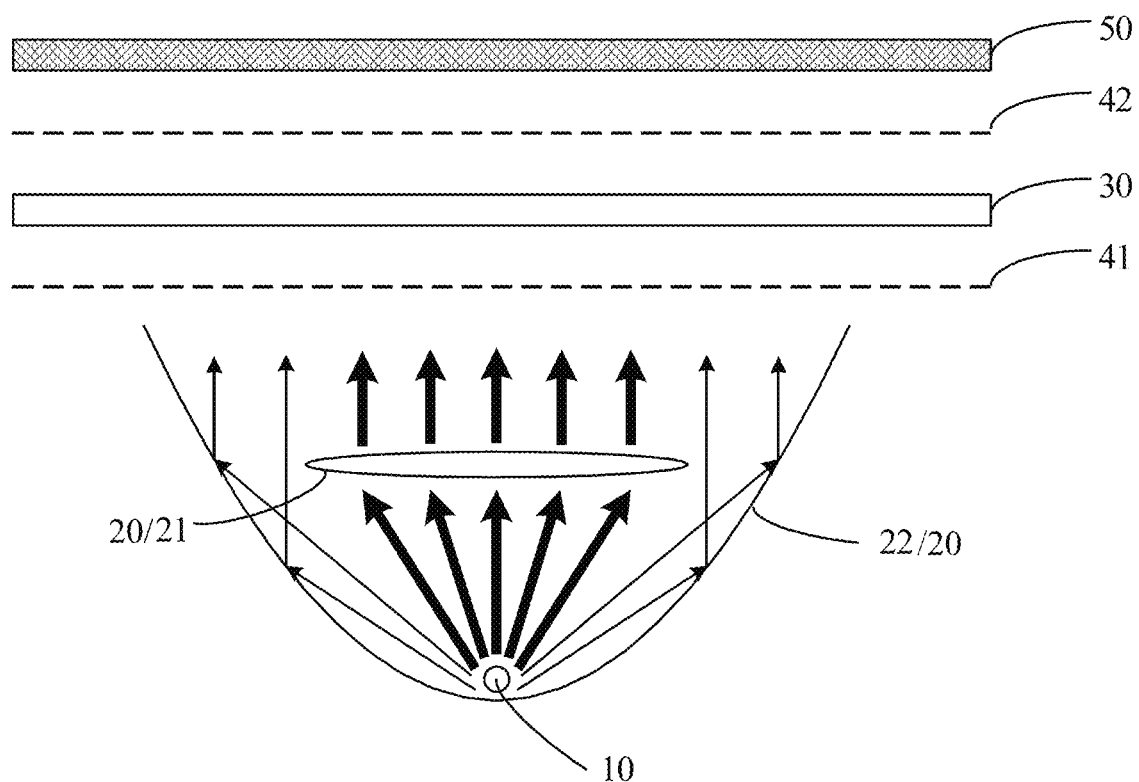
FIG. 13 shows a third structural schematic diagram of an image source in a head-up display system provided by an embodiment of the present disclosure.

As shown in FIG. 13, the collimator element 20 includes a hollow lamp cup 22. The hollow lamp cup 22 is a hollow housing with an inner reflective surface, and a direction of a port of the hollow lamp cup 22 faces the direction controller element 30. The light source 10 is arranged at an end portion of the hollow lamp cup 22, the end portion faces away from the port, and the inner reflective surface of the hollow lamp cup 22 is used to adjust the exit direction of the light from the light source 10. For example, the inner reflective surface of the hollow lamp cup 22 may have a paraboloid shape, a free-form surface shape, a regular triangular pyramid shape, an isosceles triangular pyramid shape, or a cubic pyramid shape, etc.

Also, in order to more comprehensively collimate the light emitted by the light source 10, for example, the collimator element 20 is provided with a reflective surface, and for example, is also provided with a collimating lens 21 and/or a collimating film. The collimating lens 21 and/or the collimating film are/is arranged inside the hollow lamp cup 22, and a size of the collimating lens 21 and/or the collimating film is smaller than a size of the port of the hollow lamp cup. The collimating lens 21 and/or the collimating film are/is configured to collimate a portion of the light emitted by the light source 10 in the hollow lamp cup 22 and then emit the portion of the light to the direction controller element 30. As shown in FIG. 13, the collimating lens 21 of the collimator element 20 collimates a portion of the light emitted by the light source 10 (i.e., the light indicated by a bold arrow in FIG. 13), and the exit angle of the portion of the light is relatively small; while light with a larger exit angle emitted by the light source 10 (i.e., the light shown by a thin arrow in FIG. 13) is collimated by the inner reflective surface of the hollow lamp cup 22, so that the collimating lens 21 and the hollow lamp cup 22 may be combined to more effectively collimate the light emitted by the light source 10.

Figure 14:
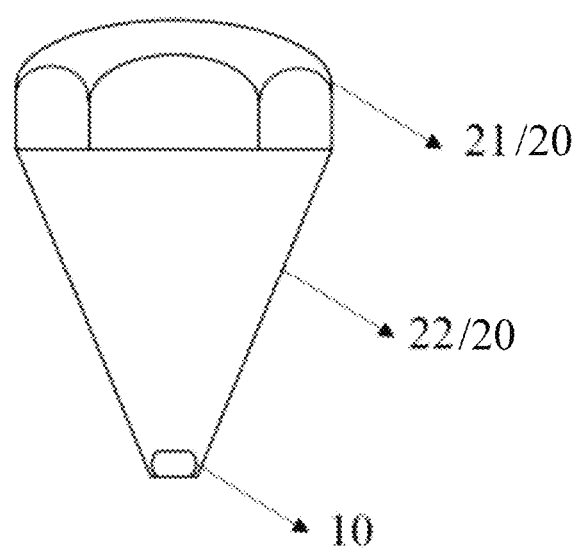
FIG. 14 shows a structural schematic diagram of a lamp cup in a head-up display system provided by an embodiment of the present disclosure.

Optionally, for example, the collimating lens 21 and/or the collimating film are/is also completely cover/covers the port of the hollow lamp cup 22; in this case, the hollow lamp cup 22 mainly plays a role of reflection, and the collimating lens 21 and/or the collimating film mainly plays a role of collimation. FIG. 14 may be referred to for a structural schematic diagram of the collimator element 20; after the light with a larger exit angle (similar to the light shown by the thin arrow in FIG. 13) emitted by the light source 10 is collimated by the hollow lamp cup, although the exit direction will change after passing through the collimating lens 21 again, due to characteristics of the light source 10 (e.g., the light source 10 is an LED lamp), most energy of the light emitted by the light source 10 is usually concentrated in a fan-shaped region, for example, the region corresponding to the bold arrow in FIG. 13, that is, most (e.g., about 80%) of the light emitted by the light source 10 is collimated by the collimating lens 21. The collimating function may also be implemented based on the collimator element 20 shown in FIG. 14, and a fabrication process of the collimator element 20 is simple and convenient. Also, when there are a plurality of collimator elements 20, the collimating lens 21 of each collimator element 20 may be cut, for example, into a regular triangle, a regular hexagon or a regular quadrilateral, so that the collimator element 20 may be closely arranged.

Figure 15A:
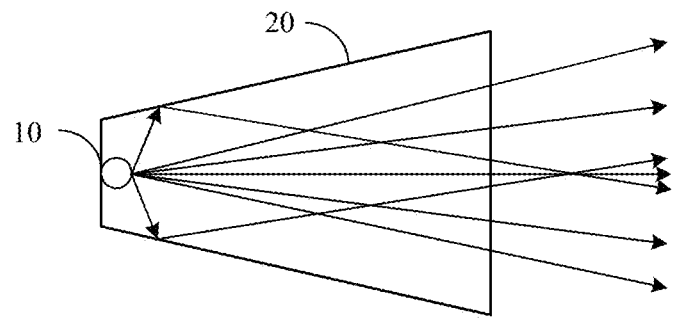
FIG. 15a shows a schematic diagram of light propagation of a quadrangular pyramid collimator element in a head-up display system provided by an embodiment of the present disclosure.
Figure 15B:
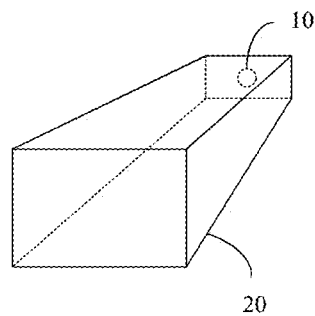
FIG. 15b shows an arrangement schematic diagram of light sources in a quadrangular pyramid collimator element in a head-up display system provided by an embodiment of the present disclosure.
Figure 15C:
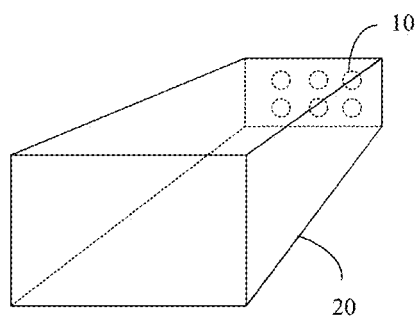
FIG. 15c shows another arrangement schematic diagram of light sources in a quadrangular pyramid collimator element in a head-up display system provided by an embodiment of the present disclosure.
Figure 15D:
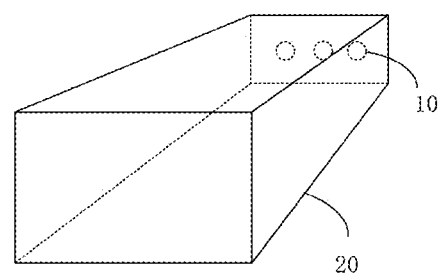
FIG. 15d shows further another arrangement schematic diagram of light sources in a quadrangular pyramid collimator element in a head-up display system provided by an embodiment of the present disclosure.

Optionally, due to the large number of collimator elements 20, in order to simplify the fabrication process, for example, the collimator element 20 in this embodiment adopts a quadrangular frustum pyramid-shaped hollow housing with an inner reflective surface, that is, the collimator element 20 has a quadrangular frustum pyramid shape, and a cross-sectional shape or an opening shape of the collimator element 20 is quadrilateral, for example, it may be a parallelogram, a rectangle, a square, or a trapezoid. The collimator element 20 has an opening that gradually becomes larger; and the opening includes the port for light exit (light exit port) of the collimator element 20. As shown in FIG. 15a and FIG. 15b, the light source 10 is arranged at a bottom end of the opening of the collimator element 20 (a left side of the collimator element 20 in FIG. 15a), and the light emitted by the light source 10 may be emitted out from the port (as shown on a right side of the collimator element 20 in FIG. 15a) after being reflected by the reflective surface inside the collimator element 20. In addition, as described above, for example, a plurality of light sources 10 are also provided in the collimator element 20. As shown in FIG. 15c, for example, the plurality of light sources 10 is arranged in a matrix into a light source point array. In FIG. 15c, there are six light sources 10 arranged in a 2×3 point array; or, as shown in FIG. 15d, for example, the plurality of light sources 10 are arranged in a linear array, and three light sources 10 are arranged linearly in FIG. 15d.

Figure 16:
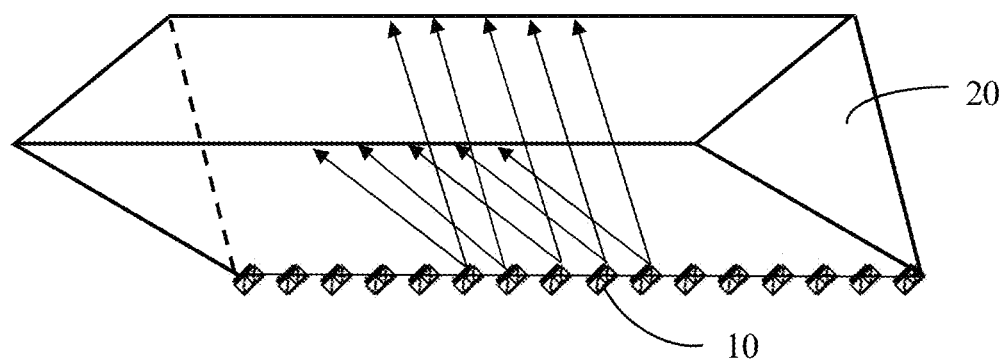
FIG. 16 shows a structural schematic diagram of a roof-shaped lamp cup in a head-up display system provided by an embodiment of the present disclosure.

Optionally, as shown in FIG. 16, the collimator element 20 is a roof-shaped lamp cup having the port; and the light sources 10 are arranged in a row at an end portion, away from the port, of the roof-shaped lamp cup; through the roof-shaped lamp cup, light emitted by a row of light sources 10 is uniformly emitted out along the port direction, so that the image source 1 can be provided with uniform light.

Figure 17:
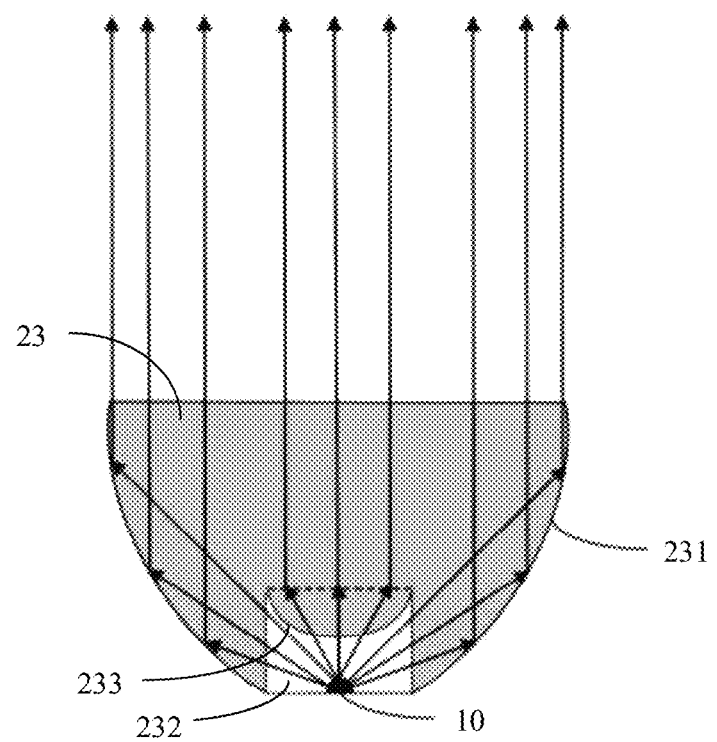
FIG. 17 shows a first structural schematic diagram of a lamp cup with a solid center in a head-up display system provided by an embodiment of the present disclosure.

For example, in an embodiment of the present disclosure, as shown in FIG. 17, the collimator element 20 may include a lamp cup with a solid center 23; the lamp cup with a solid center 23 is a solid transparent component, and a refractive index of the solid transparent component is greater than 1; a direction of the port of the lamp cup with a solid center 23 faces the direction controller element 30; the light source 10 is arranged at an end, away from the port, of the lamp cup with a solid center 23, and light emitted by the light source 10 is totally reflected when it is emitted to an inner surface of the solid transparent component.

In this embodiment, the lamp cup with a solid center 23 is a solid transparent component, and the direction of the port of the lamp cup with a solid center 23 refers to the port direction of the reflective surface 231 of the lamp cup with a solid center 23. Referring to FIG. 17, the reflective surface 231 of the lamp cup with a solid center 23 is the inner surface of the solid transparent component; the solid transparent component is provided with a cavity 232 at an end portion away from the port, and the cavity 232 is configured to place the light source 10, that is, the light source 10 is arranged at the bottom portion of the lamp cup that is away from the port of the lamp cup with a solid center; after the light emitted by the light source 10 is emitted to the reflective surface 231 of the lamp cup with a solid center 23, since the refractive index of the lamp cup with a solid center 23 is greater than 1, and a peripheral medium of the lamp cup with a solid center 23 is air (whose refractive index is 1), when the light emitted by the light source 10 reaches the reflective surface 231 of the lamp cup with a solid center 23, the light is emitted from an optically dense medium (i.e., the lamp cup with a solid center 23) to an optically thin medium (i.e., the air around the lamp cup with a solid center 23), and as long as an incident angle of the light emitted by the light source 10 and emitted to the reflective surface 231 reaches a preset angle, total reflection may occur; by setting a surface shape of the reflective surface 231 of the lamp cup with a solid center, the light emitted diagonally from the light source 10 may be collimated. For example, the reflective surface 231 of the lamp cup with a solid center is a free-form surface (i.e., it cannot be represented by a simple curved surface function mathematically), or a compound paraboloid (i.e., the reflective surface is composed of a plurality of paraboloids), both of which may well collimate the light emitted by the light source 10, but it is not limited thereto.

Figure 18:
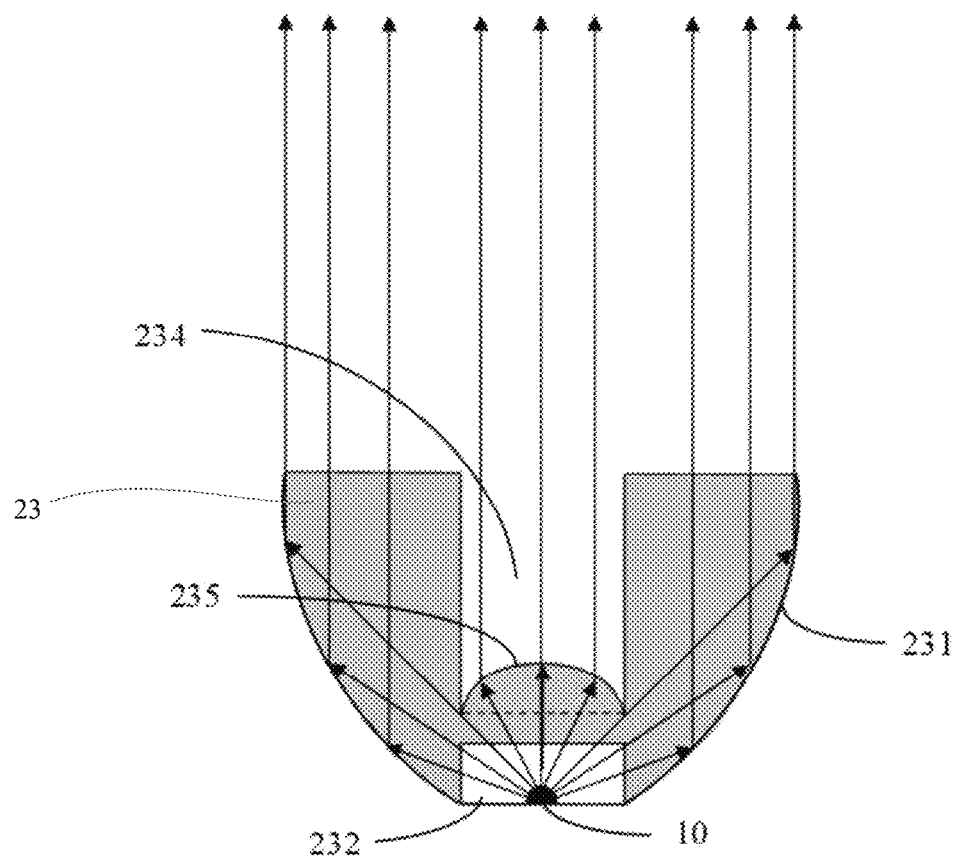
FIG. 18 shows a second structural schematic diagram of a lamp cup with a solid center in a head-up display system provided by an embodiment of the present disclosure.

For example, the collimating lens 21 may be integrated on the lamp cup with a solid center 23 to further improve the collimation effect. As shown in FIG. 17, the solid transparent component is provided with the cavity 232 at an end portion away from the port of the lamp cup with a solid center, and a surface, close to the port of the lamp cup with a solid center, of the cavity 232 is a convex surface 233. Or, as shown in FIG. 18, a slot 234 is provided in a central position of the end portion, close to the port of the lamp cup with a solid center, of the solid transparent component, and the bottom surface of the slot 234 is a convex surface 235. The lamp cup with a solid center 23 shown in FIG. 17 or FIG. 18 may be directly used as the collimator element 20.

In this embodiment, the convex surface 233 of the cavity 232 or the convex surface 235 of the slot 234 is configured to collimate the light emitted by the light source 10, that is, the convex surface 233 or the convex surface 235 is equivalent to a collimating lens 21. The convex surface 233 or the convex surface 235 is arranged in the central position of the solid transparent component, and a size of the convex surface 233 or the convex surface 235 is smaller than a size of the opening the lamp cup with a solid center 23. The convex surface 233 or the convex surface 235 is configured to collimate a portion of the light emitted by the light source 10 in the lamp cup with a solid center 23 and then emit the portion of the light to the direction controller element 30. As shown in FIG. 17, the convex surface 233 is arranged in the cavity at a tail end of the lamp cup with a solid center; and the convex surface 233 may form a convex lens to collimate the light emitted to the convex surface 233. Or, as shown in FIG. 18, the central position of the solid transparent component is provided with the slot 234; the bottom surface of the slot 234 is the convex surface 235; the convex surface 235 of the lamp cup with a solid center is configured to collimate light that cannot be reflected by the reflective surface 231 of the lamp cup with a solid center; and other light with a larger exit angle is totally reflected within the lamp cup with a solid center 23 and then collimated and emitted out of the lamp cup with a solid center 23. A material of the lamp cup with a solid center 23 is a transparent material with a refractive index greater than 1, for example, a polymer transparent material, or glass, etc.

Optionally, for example, the collimating lens 21 and/or the collimating film are/is completely cover/covers the port of the lamp cup with a solid center 23; in this case, the lamp cup with a solid center 23 mainly plays a role of reflection, and the collimating lens 21 and/or the collimating film mainly plays a role of collimation. In this case, FIG. 14 may be referred to for the structure of the collimator element 20, a working principle thereof is also the same as the related content as described above, and no details will be repeated here.

On the basis of the above-described embodiments, when the first diffuser element 41 is the diffuser element of the discrete type and the collimator element 20 is the lamp cup with a solid center 23 with better light collimation effect, after the collimated light passes through the first diffuser element 41, the light is diffused and scattered to a plurality of ranges, that is, the light is directly scattered to a plurality of regions, and each region corresponds to an observation range 200. In this embodiment, in addition to diffusing the light, for example, the first diffuser element 41 of the discrete type is also separate the light into different observation ranges 200, a process of separating the light into different observation ranges 200 is similar to the function of the direction controller element 30 controlling the direction of the light, both may control the direction of light, that is, the diffuser element may also play a role of direction control, and may emit light to the observation ranges 200 corresponding to different directions.

Figure 19:
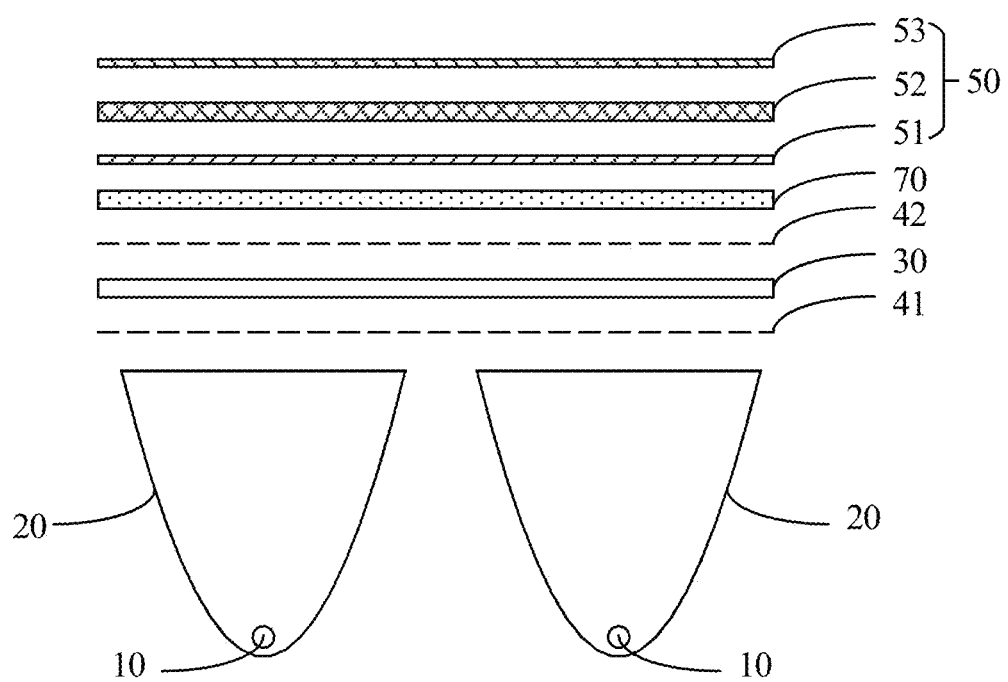
FIG. 19 shows a fourth structural schematic diagram of an image source in a head-up display system provided by an embodiment of the present disclosure.

On the basis of the above-described embodiments, as shown in FIG. 19, the head-up display system further includes a polarization controller element 70; and the liquid crystal panel 50 includes a first polarizer 51, a liquid crystal layer 52 and a second polarizer 53.

For example, the first polarizer 51 and the second polarizer 53 are respectively arranged on two sides of the liquid crystal layer 52, and the first polarizer 51 is arranged between the liquid crystal layer 52 and the light source 10; the first polarizer 51 is configured to transmit the first linearly polarized light; and the second polarizer 53 is configured to transmit the second linearly polarized light, a polarization direction of the second linearly polarized light is perpendicular to a polarization direction of the first linearly polarized light. The polarization controller element 70 is arranged between the light source 10 and the first polarizer 51, the polarization controller element 70 is configured to transmit the first linearly polarized light and reflect or absorb the second linearly polarized light.

In an embodiment of the present disclosure, upper and lower sides of the liquid crystal layer 52 of the liquid crystal panel 50 are respectively provided with polarizers with polarization states perpendicular to each other, that is, the first polarizer 51 and the second polarizer 53; the first linearly polarized light can pass through the first polarizer 51, the second linearly polarized light can pass through the second polarizer 52, and the polarization direction of the first linearly polarized light is perpendicular to the polarization direction of the second linearly polarized light. Since the light emitted by the light source 10 is generally non-polarized light, that is, about 50% of the light may be absorbed by the first polarizer 51 between the liquid crystal layer and the light source 10, and the polarizer is generally attached to a surface of the liquid crystal layer 52, the portion of light energy will cause the first polarizer 51 and the liquid crystal layer 52 to generate heat, which affects the service life of the liquid crystal panel 50.

According to an embodiment of the present disclosure, the polarization controller element 70 is provided between the light source 10 and the first polarizer 51; and the polarization controller element 70 can transmit the first linearly polarized light and reflect or absorb the second linearly polarized light, so that light that can reach the first polarizer 51 is only the first linearly polarized light, so as to prevent the first polarizer 51 from absorbing the second linearly polarized light and prevent the liquid crystal panel 50 from absorbing heat, thereby prolonging the service life of the liquid crystal panel 50. For example, the second linearly polarized light in the light emitted by the light source 10 may be absorbed by the polarization controller element 70, in a case where there is a certain distance between the polarization controller element 70 and the liquid crystal panel 50. In addition, if the polarization controller element 70 can reflect the second linearly polarized light, for example, the reflected second linearly polarized light is reflected to the polarization controller element 70 again by reflection of other components (e.g., the reflective surface of the collimator element 20, etc.), and a portion of the light may be converted into the first linearly polarized light, so that more light may be used for imaging of the liquid crystal panel 50, thereby improving the light utilization rate.

Optionally, the polarization controller element 70 is a reflection-type polarized reflective film, illustratively a dual brightness enhancement film (DBEF), a brightness enhancement film (BEF), or a photonic crystal having polarization and incident angle selective transmittance, etc., and when the polarization controller element 70 can reflect the second linearly polarized light, for example, the polarization controller element 70 is attached to an outer surface of the liquid crystal panel 50.

Figure 20:
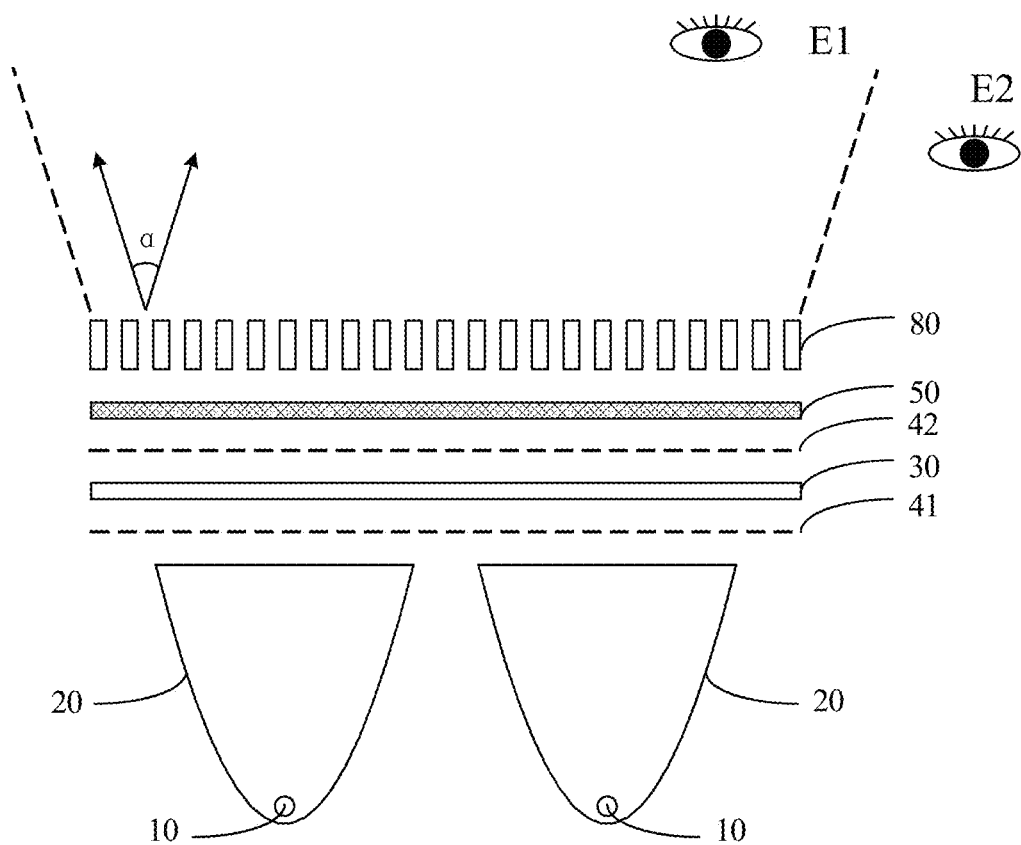
FIG. 20 shows a fifth structural schematic diagram of an image source in a head-up display system provided by an embodiment of the present disclosure.

On the basis of the above-described embodiments, referring to FIG. 20, the head-up display system further includes: a light blocking layer 80; the light blocking layer 80 is arranged on a side of the liquid crystal panel 50 that is away from the light source 10, and the light blocking layer 80 is configured to limit an exit angle of the light emitted from the liquid crystal panel 50.

According to an embodiment of the present disclosure, the light blocking layer 80 includes a plurality of light blocking gratings with a preset height, and a grating array is formed by a plurality of protruding light blocking gratings to physically block propagation of light in certain directions. By designing a height and a width of the light blocking grating, an angle at which the observer can view the light may be restricted. As shown in FIG. 20, the light blocking layer 80 restricts the light to a viewing angle α, thereby forming an observable region; that is, a human eye E1 is located in the observable region, and in this case, the light emitted by the light source 10 can be seen; however, a human eye E2 is located outside the observable region, so that the human eye E2 cannot see the light emitted by the light source 10, and the human eye E2 cannot observe an image of the liquid crystal panel 50.

According to this embodiment, for example, the light blocking layer 80 is a layer of grating array, and the grating array may be horizontal, vertical, or at any angle, so that only light in a direction parallel to the grating may pass through. For example, the viewing angle of the light blocking layer 80 is 48 degrees, 60 degrees, 75 degrees, or any other angle required. In addition, for example, the light blocking layer 80 is an orthogonal stack of two layers of grating arrays, or a stack of two layers of gratings staggered at a certain angle. For example, a grating array of each layer is horizontal, vertical, or at any angle. For example, the viewing angle is 48 degrees, 60 degrees, 75 degrees, or any other angle required. For example, the light blocking layer 80 may be an anti-peeping grating.

According to an embodiment of the present disclosure, the light blocking layer 80 is added to the outer surface of the liquid crystal panel 50, which may limit a light exit angle and achieve certain special purposes; for example, an image source 1 without the light blocking layer 80 is provided at a surface of a vehicle console, so that a driver can see the image of the liquid crystal panel 50 and an image reflected by the windshield at the same time, which affects the driver driving the vehicle. The light blocking layer 80 can make the light exit only toward the direction of the windshield, and the image of the liquid crystal panel 50 per se cannot be seen from the driver's perspective, which can prevent the image of the liquid crystal panel 50 per se from affecting driving.

Figure 21:
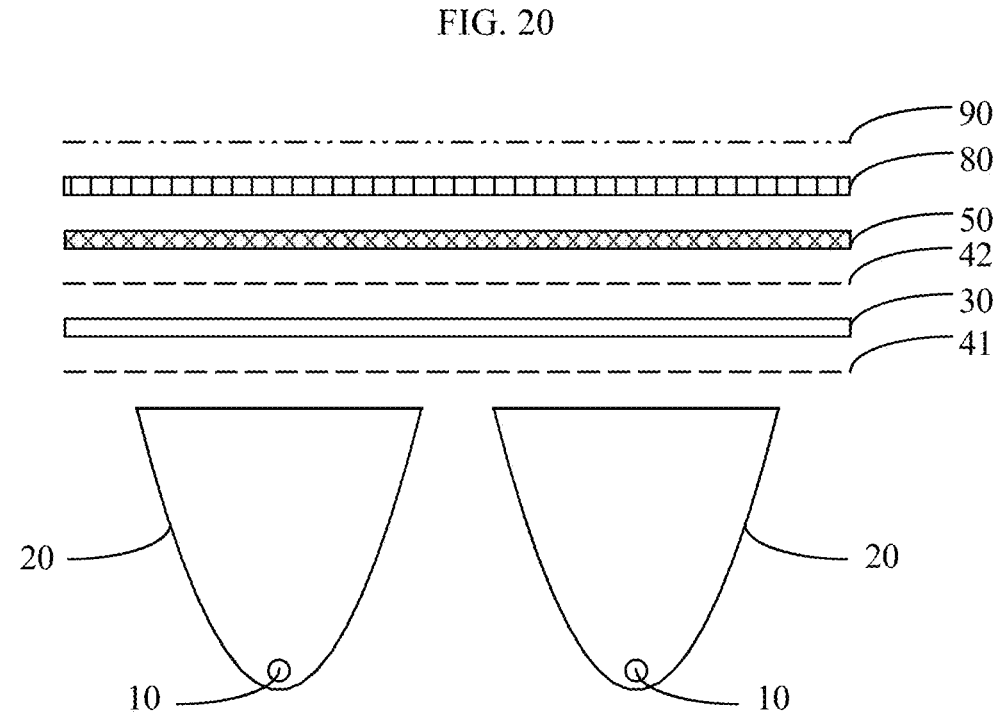
FIG. 21 shows a sixth structural schematic diagram of an image source in a head-up display system provided by an embodiment of the present disclosure.

Optionally, referring to FIG. 21, the head-up display system further includes a light scattering layer 90; the light scattering layer 90 is arranged on a side, faces away from the liquid crystal panel 50, of the light blocking layer 80, and the light scattering layer 90 is configured to scatter external ambient light. In an embodiment of the present disclosure, a light scattering layer 90 is provided on an outside of the light blocking layer 80, which may scatter external ambient light, for example, sunlight, etc., which may prevent glare caused by external sunlight irradiating a surface of the light blocking layer 80. For example, the combination of the light scattering layer 90 and the light blocking layer 80 may be formed in a one-piece manner, for example, a frosted anti-peeping grating.

In addition, it is to be noted that, in all the above-described embodiments, in order to facilitate description of the structure of the head-up display system, or to facilitate description of a propagation situation or direction of light, there is a certain distance between respective elements, for example, there is an interval between the direction controller element 30 and the first diffuser element 41 in FIG. 1, which is not used to limit that there must be an interval between the two, that is, for example, the direction controller element 30 and the first diffuser element 41 are attached to each other, or the gap between the two is very small. Other two adjacent elements also follow the arrangement mode, unless it is specifically stated that a certain distance between the two elements is required, for example, an interval is to be between the first diffuser element 41 and the second diffuser element 42 as described above. In addition, the drawings in the above-described embodiments are only schematic structural diagrams, which only schematically show sizes of respective elements, and do not represent an actual size proportion.

In the above-described embodiments of the present disclosure, with respect to the diffuser element, only the first diffuser element may be provided, or the first diffuser element and the second diffuser element may also be provided. In a case where only the first diffuser element is provided, for example, the first diffuser element is referred to as the diffuser element. In a case where the first diffuser element and the second diffuser element are provided, the diffuser element includes the first diffuser element and the second diffuser element. It can be understood that, the number of diffuser elements may be set to more than two according to needs.

In the above-described embodiments of the present disclosure, the direction controller element 30 is, for example, the light concentrator element. In the embodiments of the present disclosure to be described below, for example, the direction controller element 108 includes a collimator element, or for example also includes other elements such as a light concentrator element.

Figure 22:
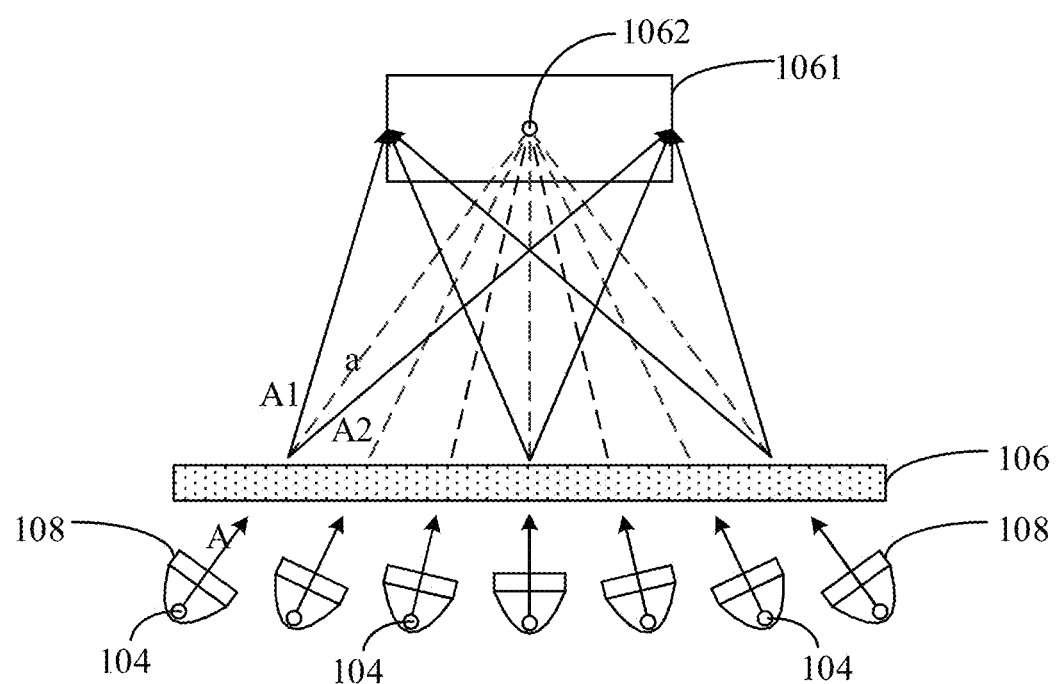
FIG. 22 shows a first structural schematic diagram of a light control apparatus provided by an embodiment of the present disclosure.

An embodiment of the present disclosure further provides a light control apparatus, as shown in FIG. 22, which includes: a diffuser element 106 and a direction controller element 108.

The direction controller element 108 is configured to concentrate the light emitted by light sources in different positions, that is, concentrate the light to a same preset position 1062; the diffuser element 106 is provided on a side, faces away from the light source, of the direction controller element 108, and the diffuser element 106 is configured such that the light from the direction controller element 108 is diffused and then form a light spot 1061 with a preset shape. The light spot 1061 corresponds to the first preset region.

For example, a plurality of direction controller elements 108 are used to implement concentration of light. For example, referring to FIG. 22, light sources 104 are arranged in different positions; in FIG. 22, it is illustrated by taking 7 light sources 104 being provided as an example; correspondingly, 7 direction controller elements 108 are provided to control a direction of light emitted by the light source 104. As shown in FIG. 22, a direction controller element 108 is provided for each light source 104. As shown in FIG. 22, without the diffuser element 106, the direction controller element 108 concentrates light emitted by a plurality of light sources 104 to a preset position 1062. The preset position 1062 corresponds to a second preset region. An area of the second preset region is smaller than an area of the first preset region. For example, in FIG. 22, it is illustrated by taking 1062 being a point position as an example; the preset position 1062 in this embodiment may also be a small region, that is, it is only necessary to concentrate the light emitted by the light source 104 into the region. For example, each direction controller element 108 is similar to a small light control apparatus, and a direction of the light emitted by the light source 104 is adjusted by setting orientations of the direction controller elements 108 in different positions, so as to implement light concentration.

At the same time, if light at different positions is only concentrated to the preset position 1062 of a small range, when the light control apparatus is applied to the light source of the image source, the image source can only image in a small range, which is inconvenient for an observer to view an image formed by the image source. In this embodiment, the light is diffused by the diffuser element 106 to form the light spot 1061 with a preset shape and a larger imaging range, so that it is convenient for the observer to view an image formed by the image source in a large range. For example, the direction controller element 108 at leftmost side of FIG. 22 is taken as example to illustrate. As shown in FIG. 22, in a case where the diffuser element 106 is not provided, light A emitted by the light source 104 on the leftmost side can be irradiated to the preset position 1062 along an optical path a; after the diffuser element 106 is arranged outside the direction controller element 108, the light A is scattered into a plurality of rays of light (including light A1, light A2 and the like) by the diffuser element 106 and scattered into one range, i.e., the light spot 1061, so that it is convenient for the observer to view the image formed by the image source in the range of the light spot 1061. Optionally, for example, the diffuser element 106 is a diffractive optical element (DOE), e.g., a beam shaper; the size and the shape of the light spot are determined by the microstructure of the beam shaper, the shape of the light spot includes, but is not limited to, a circle, an oval, a square, a rectangle or a batwing shape. For example, the diffusing angle of the light spot after diffusion in the side view direction is 10 degrees, and further for example, is 5 degrees, but it is not limited thereto; and the diffusing angle in the front view direction is 50 degrees, and further for example, is 30 degrees, but it is not limited thereto. For example, the side view direction is the left-and-right direction or the horizontal direction, and for example, the front view direction is the up-and-down direction or the vertical direction.

For example, there are many direction controller elements 108, different direction controller elements 108 are arranged at different positions and used for adjusting the exit directions of light emitted by light sources at different positions, and the exit directions of the light emitted by the light sources at different positions all point to the same preset position. As shown in FIG. 22, there are seven direction controller elements 108 in FIG. 22. For example, one direction controller element 108 can adjust the light emitted by one light source 104, or can adjust the light emitted by a plurality of light sources 104, and this embodiment is not limited in this aspect. Namely, one or more light sources 104 may be arranged in one direction controller element 108.

Those skilled in the art can understand that in FIG. 22, the diffusing effect of the diffuser element 106 is just schematically illustrated, the diffuser element 106 can diffuse the light into the range of the light spot 1061, but does not completely limit the light emitted by the light source 104 in the light spot 1061. Namely, after passing through the diffuser element 106, the light A may form a light spot of a larger range, the light emitted by other light sources 104 may form other light spots through the diffuser element 106, but the light emitted by all the light sources 104 all can reach the light spot 1061.

In the light control apparatus provided by the embodiments of the present disclosure, the light at different positions is concentrated to the same position by the direction controller element, so that the brightness of the light can be improved; and the light is diffused by the diffuser element, so that the light spot with the preset shape can be formed and it is convenient to subsequently image in the range of the light spot, so that while the brightness of the light is improved, the imaging range can also be extended. In addition, the light source can provide light with sufficient brightness without high power, so that the heat dissipation requirement for a device of the light source can be reduced.

Figure 23:
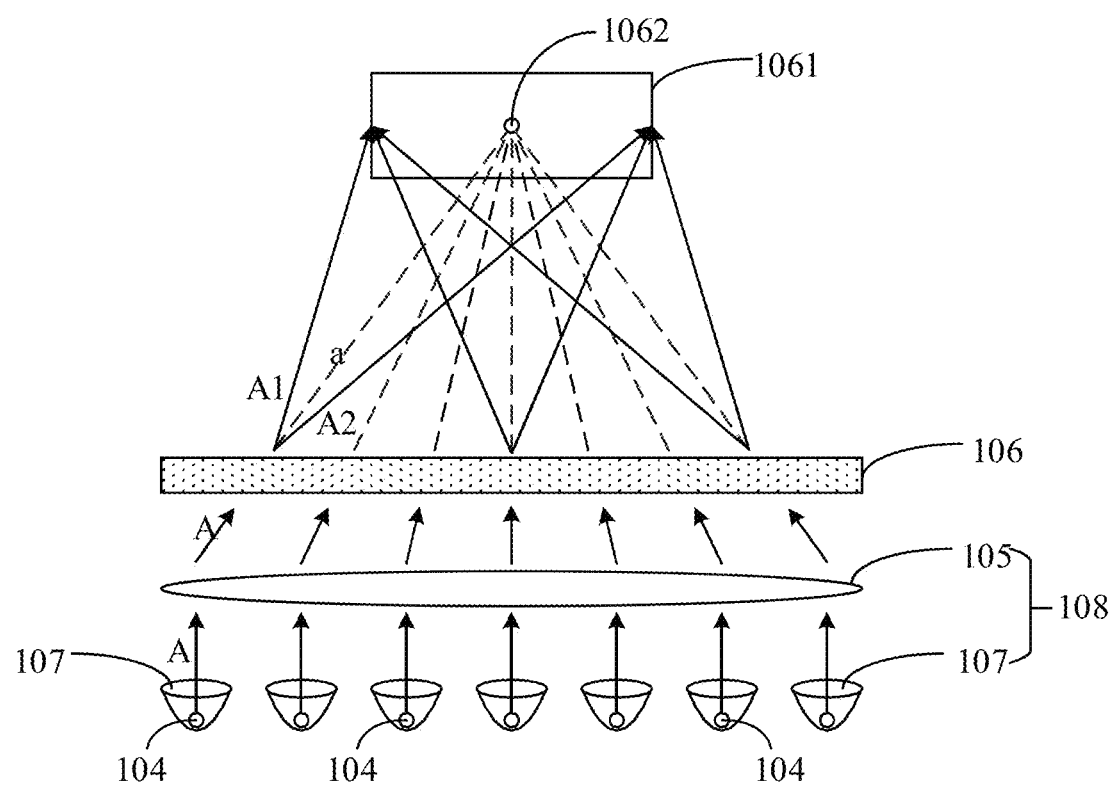
FIG. 23 shows a second structural schematic diagram of a light control apparatus provided by an embodiment of the present disclosure.

Based on the above-mentioned embodiment, as shown in FIG. 23, the direction controller element 108 includes a collimator element 107, the collimator element 107 can collimate the light emitted by the light source 104, i.e., collimate the light irradiated to different directions by the light source, so that the light emitted by the direction controller elements 108 is consistent or basically consistent in direction.

For example, the collimator element 107 is a collimating lens, the collimating lens includes one or more of a convex lens, a concave lens, a Fresnel lens or a combination thereof, and for example, the lens combination is a combination of the convex lens and the concave lens, or a combination of the Fresnel lens and the concave lens, or the like; or the collimator element 107 is a collimating film, and configured to adjust the exit direction of the light into a preset angle range. In this case, the distance between the collimator element 107 and the position of the light source 104 is equal to a focal length of the collimator element 107, i.e., the light source 104 is arranged at the focal point of the collimator element 107.

Optionally, as shown in FIG. 22, for example, concentration of the light at different positions is implemented by adjusting the exit direction of the direction controller element 108. Or, for example, concentration of the light is implemented by a light concentrator element. With reference to FIG. 23, the direction controller element 108 further includes a light concentrator element 105; and the light concentrator element 105 is arranged between the light source 104 and the diffuser element 106. When the direction controller element 108 includes the collimator element 107, the light concentrator element 105 is arranged between the collimator element 107 and the diffuser element 106; and the light concentrator element 105 is configured to concentrate different light to the same preset position 1062. Namely, even though the orientation of the direction controller element 108 is not specifically set, different light can also be concentrated to one preset position 1062 by the light concentrator element 105. For example, as shown in FIG. 23, for the light concentrator element 105, a plurality of collimator elements 107 can be correspondingly arranged.

Based on the above-mentioned embodiment, with reference to FIG. 20, the light control apparatus further includes the light blocking layer 80, and specifically, it may refer to FIG. 20 and the above-mentioned related description, which is not repeated herein.

In addition, the light blocking layer 80 is to be arranged on the outer surface of an device for displaying. For example, when a liquid crystal display uses the light control apparatus provided by this embodiment as a backlight source, the light blocking layer 80 is arranged on the outer surface of the liquid crystal display, and in this case, an image formed by the liquid crystal display can be blocked, i.e., only an observer in an observing region can see the image formed by the liquid crystal display.

Figure 24:
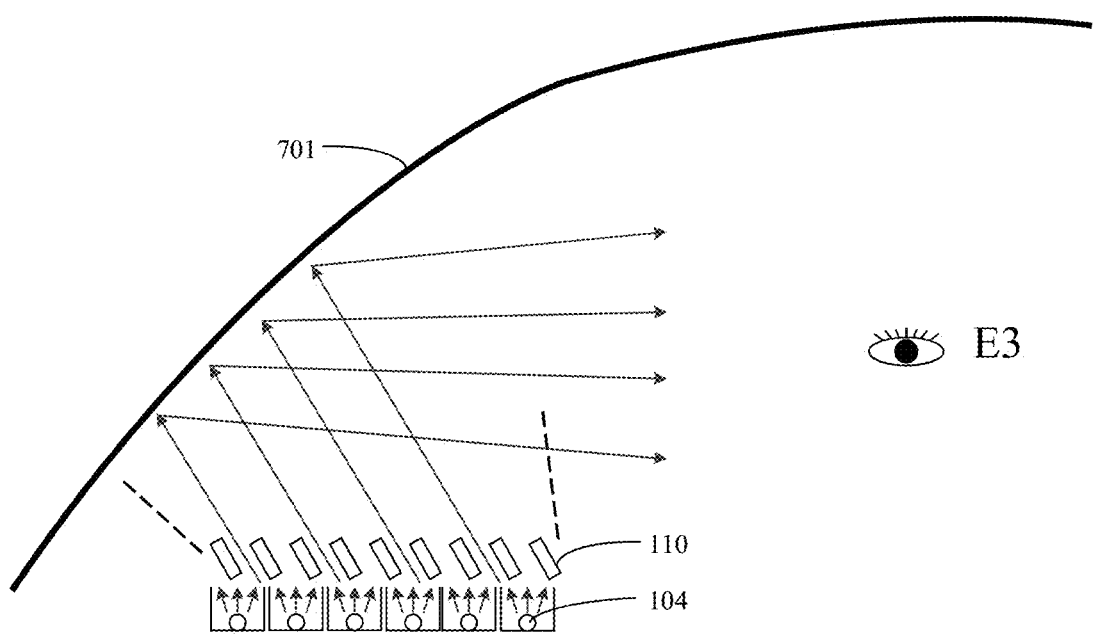
FIG. 24 shows a schematic diagram of a light control apparatus provided by an embodiment of the present disclosure when imaging on a windshield.

Optionally, for example, the light control apparatus is used in a HUD to implement light control on the HUD; and by the light blocking layer 80, a driver can be prevented from directly viewing a screen of the HUD. With reference to FIG. 24, the height direction of a light blocking gratings of the light blocking layer 80 faces a windshield 701. For example, the height direction of the light blocking gratings refers to the direction of the light blocking element from one side of the light source 104 to the outside of the light control apparatus, also refers to the direction of exit light of the light control apparatus; and in FIG. 24, the light blocking gratings are represented with small rectangles, and the length direction of the rectangle is the above-mentioned "height direction of the light blocking gratings". When the HUD works, a real image can be formed on the surface of the screen, a virtual image can also be formed through the windshield 701, and due to the arrangement of the light blocking layer

80, eyes E3 of the driver cannot view the real image on the screen of the HUD, and can only view the virtual image formed by the HUD through the windshield 701; that is, the screen of the HUD cannot be directly viewed from the position of the user, so that when the user drives a vehicle, it can be avoided that the viewing field of the user is influenced or the user is dizzied due to the brightness when the real image is formed on the screen of the HUD, and thus, safety in the driving process can be improved.

Also, in this embodiment, each direction controller element 108 in FIG. 22 and FIG. 23 further includes a reflecting element; and the reflecting element is configured to reflect the light emitted by the light source 104 to the diffuser element 106.

For example, the reflecting element includes a lamp cup; the lamp cup is a hollow housing surrounded by a reflective surface, and the opening direction of the lamp cup faces the diffuser element 106; and the bottom of the lamp cup, which is away from an opening, is used for arranging the light source 104. For example, the inner wall (i.e., the inner wall of a groove of the reflecting element) of the lamp cup is the reflective surface of the lamp cup.

In addition, as shown in FIG. 23, the direction controller element 108 further includes: a collimator element 107; the collimator element 107 is arranged inside the lamp cup, and the size of the collimator element 107 is smaller than the size of the opening of the lamp cup; and the collimator element 107 is configured to collimate part of light emitted by the light source in the lamp cup and then emit the collimated light to the diffuser element 106.

For example, in some other embodiments, the lamp cup is the lamp cup with a solid center, i.e., the lamp cup is a solid transparent component with the reflective surface, and the refractive index of the solid transparent component is greater than 1; the opening direction of the lamp cup with a solid center faces the diffuser element 106; and the tail end of the lamp cup with a solid center, which is away from an opening, is used for arranging the light source 104. The specific structure of the lamp cup with a solid center can refer to FIG. 17 and FIG. 18, and is not repeated herein.

Figure 25:
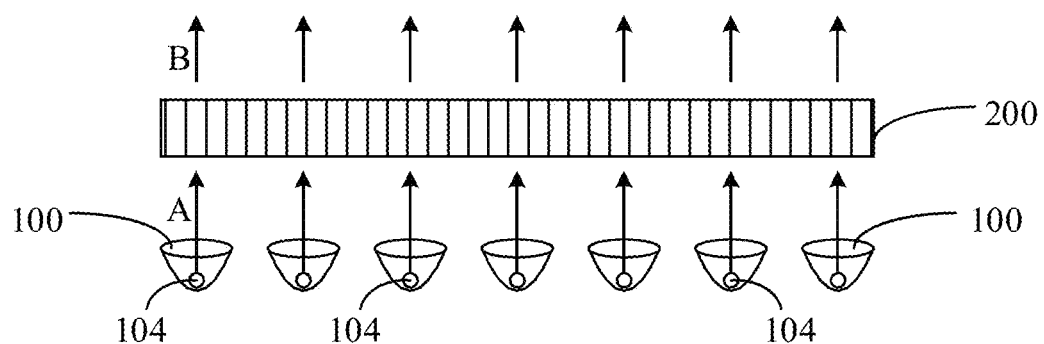
FIG. 25 shows a first structural schematic diagram of a passive light-emitting image source provided by an embodiment of the present disclosure.
Figure 26:
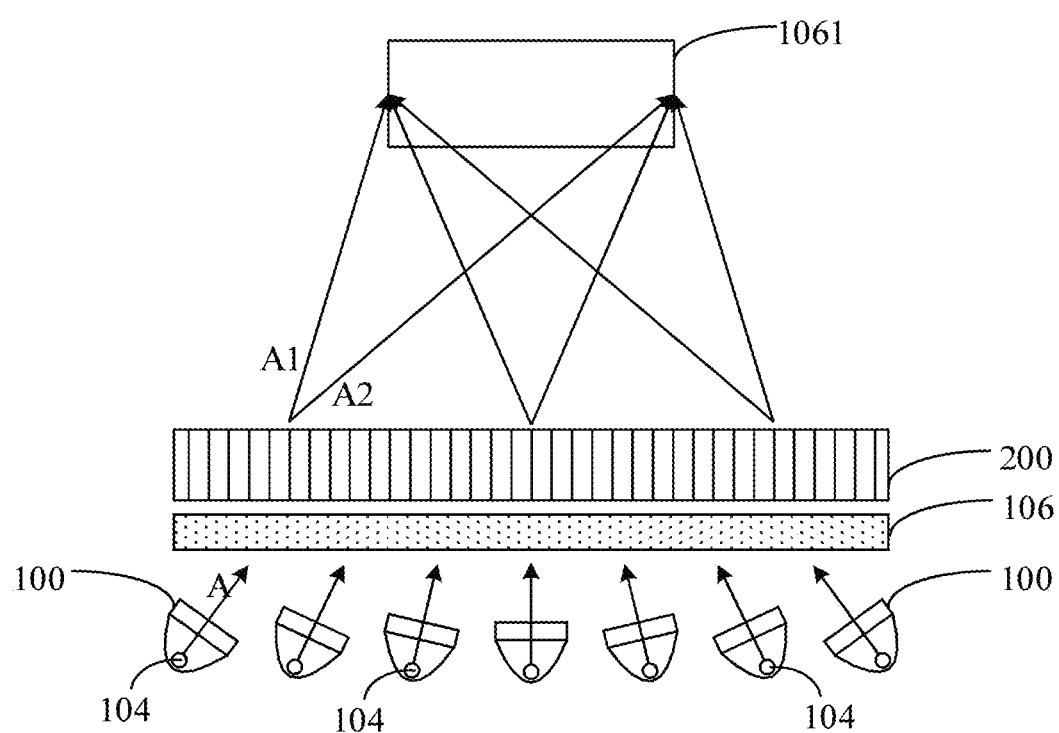
FIG. 26 shows a second structural schematic diagram of a passive light-emitting image source provided by an embodiment of the present disclosure.

Based on the same inventive concept, another embodiment of the present disclosure further provides a passive light-emitting image source. With reference to FIG. 25 or FIG. 26, the passive light-emitting image source includes a light control apparatus 100, a light source 104 and a liquid crystal layer 200. The light source 104 and the liquid crystal layer 200 are arranged on two sides of a direction controller element 108 of the light control apparatus 100.

In this embodiment, for example, a liquid crystal material in the liquid crystal layer 200 is illustratively a common liquid crystal, e.g., a twisted nematic (TN) liquid crystal, a high twisted nematic (HTN) liquid crystal, a super twisted nematic (STN) liquid crystal, a formated super twisted nematic (FSTN) liquid crystal, or the like; or, for example, the liquid crystal layer 200 is a blue phase liquid crystal. For example, the light source 104 is an electroluminescent device, e.g., a light emitting diode (LED), an incandescent lamp, a laser, a quantum dot light source, or the like, or for example, may be an organic light-emitting diode (OLED), a Mini LED, a Micro LED, a cold cathode fluorescent lamp (CCFL), an electroluminescent display (ELD), a cold LED light source (CLL), an electro luminescent (EL) device, a field emission display (FED), a halogen tungsten lamp, a metal halide lamp, or the like.

The working principle of the passive light-emitting image source provided by this embodiment is basically similar to the principle of a common passive light-emitting image source. For example, after light emitted by the light source 104 is processed through the light control apparatus 100, the light is provided for the liquid crystal layer 200; that is to say, the combination of the light control apparatus 100 and the light source 104 can be regarded as the backlight source for providing the light for imaging of the liquid crystal layer 200. The liquid crystal layer 200 includes liquid crystals, and based on the characteristics of the liquid crystal layer 200, the liquid crystal layer 200 can deflect linearly polarized light.

In addition, the light control apparatus 100 can collimate and diffuse the light emitted by the light source 104. With reference to FIG. 26, by the collimating and diffusing effect of the light control apparatus 100 on the light, the liquid crystal layer 200 can form a light spot with a preset shape at a preset position 1061, and in FIG. 26, a rectangular light spot is shown as an example. Namely, an observer can observe a clear image formed by the liquid crystal layer 200 at the preset position 1061. Also, in FIG. 26, it is illustrated by taking a case that a diffuser element 106 is arranged below the liquid crystal layer 200 (the diffuser element 106 is arranged on one side of the liquid crystal layer 200 close to the light source 104) as an example; or, for example, the diffuser element 106 is arranged on one side of the liquid crystal layer 200 away from the light source 104, which can also achieve the same diffusing effect.

The HUD technology adopts an optical reflection principle to project vehicle information such as vehicle speed on a windshield or other glass, which may avoid distraction caused by a driver looking down at a dashboard during driving, thereby bringing a better driving experience while improving a driving safety factor. A common windshield HUD image source is mostly a liquid crystal display (LCD). If the HUD adopts the common LCD image source, the brightness of an HUD image displayed on the windshield is low; and generally, the brightness of the LCD image source is increased to ensure the brightness of the HUD image displayed on the windshield, which not only leads to higher power consumption of the image source, but also causes greater heat generation, increasing heat dissipation requirements for HUD. In addition, the viewing field angle and a display region of a common light source of the HUD can be extended on the basis of an optical design method of a free-form reflector, which also can cause the problems of insufficient brightness, or the like, and if the brightness of the image is ensured, the light source may generate high electrical power consumption. If the passive light-emitting image source provided by this embodiment is applied to the HUD, the light exit angle of the image source can be controlled, and the light is limited to be within the light spot range, so that the utilization rate and the light transmittance of the light emitted by the light source are improved, the high-brightness light can be emitted by the low-power light source, it is convenient for subsequent high-brightness imaging, and energy consumption of the light source is reduced; and due to improvement of the light transmittance, the light control apparatus cannot absorb a large amount of light energy, generates less heat, and has lower heat dissipation requirements for the HUD.

For example, as shown in FIG. 25, the included angles between planes where light exit ports of a plurality of light control apparatuses 100 are positioned and the liquid crystal layer 200 are the same. For example, the planes where the light exit ports of the plurality of light control apparatuses 100 are positioned are parallel to the liquid crystal layer 200. Such a setting mode is beneficial for placing the plurality of light control apparatuses 100. As shown in FIG. 25, the plurality of light control apparatuses 100 are sequentially arranged.

For example, as shown in FIG. 26, the plurality of light control apparatuses 100 are sequentially arranged, and the included angles between the planes where the light exit ports of the plurality of light control apparatuses 100 are positioned and the liquid crystal layer 200 are different. As shown in FIG. 26, the included angles between the planes where the light exit ports of the plurality of light control apparatuses 100 are positioned and the liquid crystal layer 200 are gradually increased.

Figure 27A:
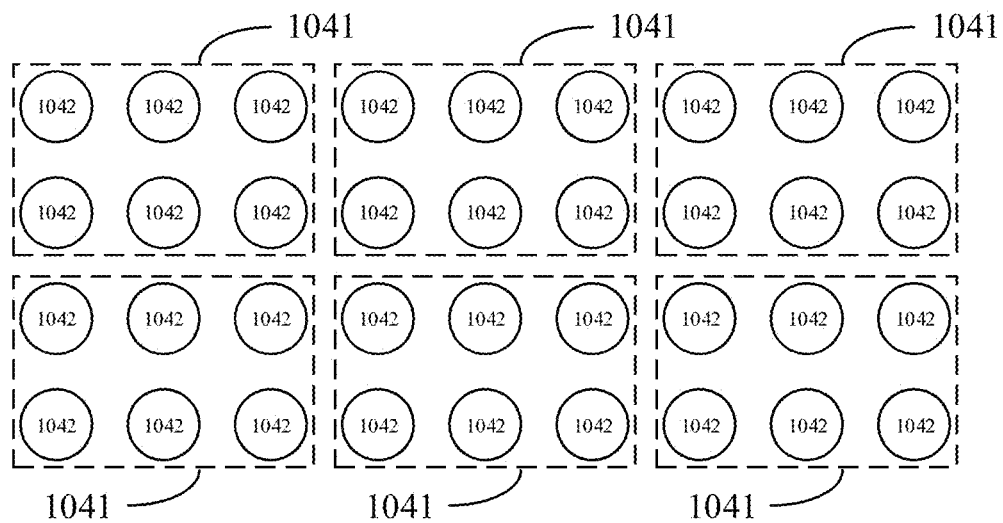
FIG. 27a shows a first arrangement schematic diagram of an electroluminescent array provided by an embodiment of the present disclosure.

Based on the above-mentioned embodiment, with reference to FIG. 27a, the light source 104 is an electroluminescent array consisting of one or more electroluminescent modules 1041, and each electroluminescent module 1041 includes one or more electroluminescent devices 1042. In FIG. 27a, it is illustrated by taking a case that one electroluminescent module 1041 includes six electroluminescent devices 1042 as an example. The light control apparatus 100 includes one or a plurality of reflecting elements, and each electroluminescent module 1041 is correspondingly provided with one reflecting element (for example, the reflecting element is the inner surface of a hollow lamp cup). Namely, in this embodiment, for the reflecting element, for example, one electroluminescent device 1042 is correspondingly arranged, or, for example, a plurality of electroluminescent devices 1042 are arranged, and it can be determined according to actual situations. For example, the electroluminescent device may be an incandescent lamp, an LED, a laser, a quantum dot light source, or the like.

Figure 27B:
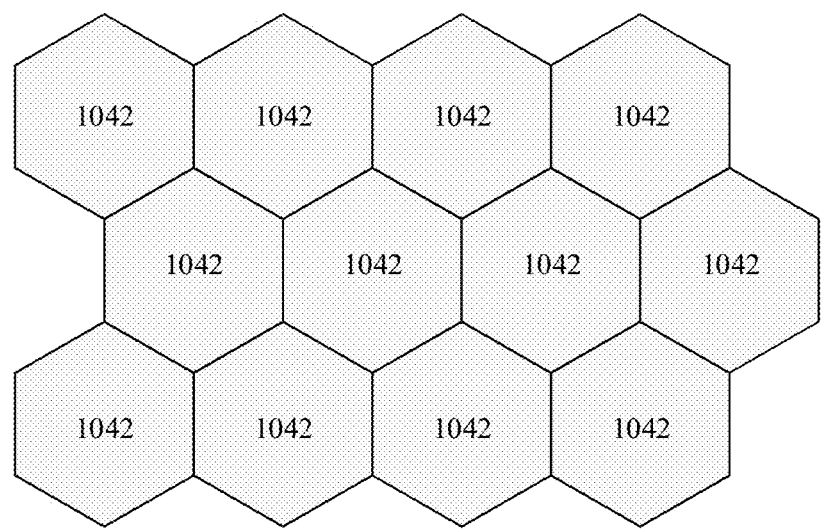
FIG. 27b shows a second arrangement schematic diagram of an electroluminescent array provided by an embodiment of the present disclosure.
Figure 27C:
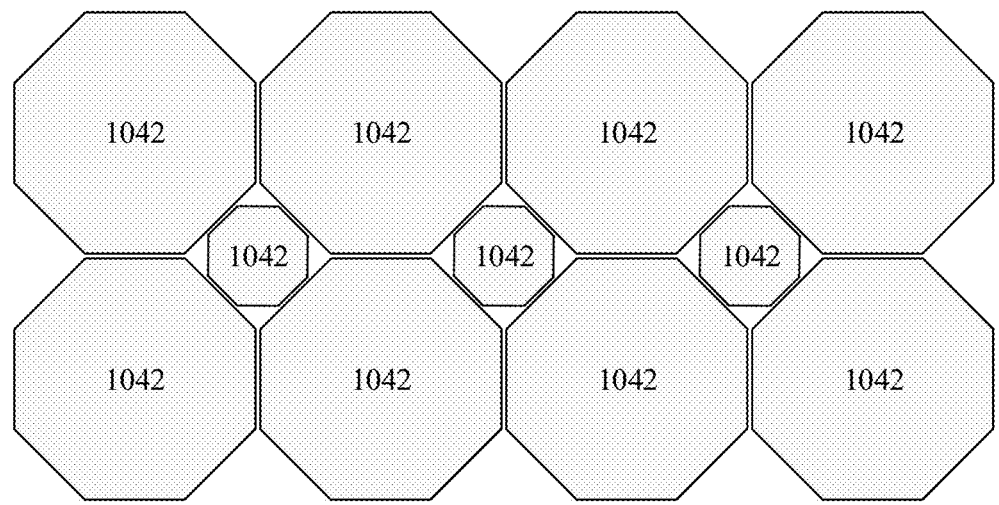
FIG. 27c shows a third arrangement schematic diagram of an electroluminescent array provided by an embodiment of the present disclosure.
Figure 27D:
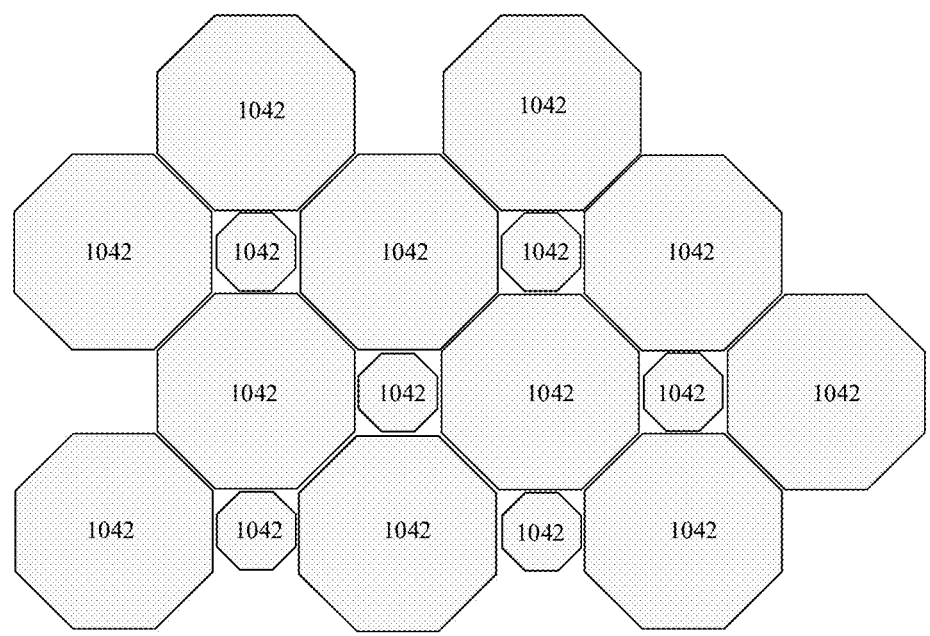
FIG. 27d shows a fourth arrangement schematic diagram of an electroluminescent array provided by an embodiment of the present disclosure.

In this embodiment, FIG. 27a is a top view of the passive light-emitting image source, and FIG. 27a shows a representation form of the electroluminescent array. For example, the electroluminescent device 1042 is located in the light control apparatus 100, so the backlight source shape of the passive light-emitting image source is decided by the light control apparatus 100. The electroluminescent device 1042 is generally a point light source, so the light emitted by the electroluminescent device 1042 can be the most efficiently utilized by adopting a circular light control apparatus 100 (for example, a lamp cup with a circular port is provided in the light control apparatus 100); and when the circular light control apparatuses 100 are arranged, there is a gap between two light control apparatuses, so that the space utilization rate is reduced. In order to balance the light utilization rate and the space utilization rate, for example, the electroluminescent array illustratively adopts a regular hexagonal arrangement mode, as shown in FIG. 27b; and the regular hexagonal arrangement mode improves the space utilization rate, and reduces the light utilization rate. Optionally, the electroluminescent array adopts a regular octagonal arrangement mode, as shown in FIG. 27c and FIG. 27d, the gaps can be filled with the small regular octagonal light control apparatuses 100, and the regular octagon is closer to the circle than the regular hexagon, so the light utilization rate is higher, and compared to the circular array, the regular octagonal electroluminescent array also has the higher space utilization rate.

Figure 28:
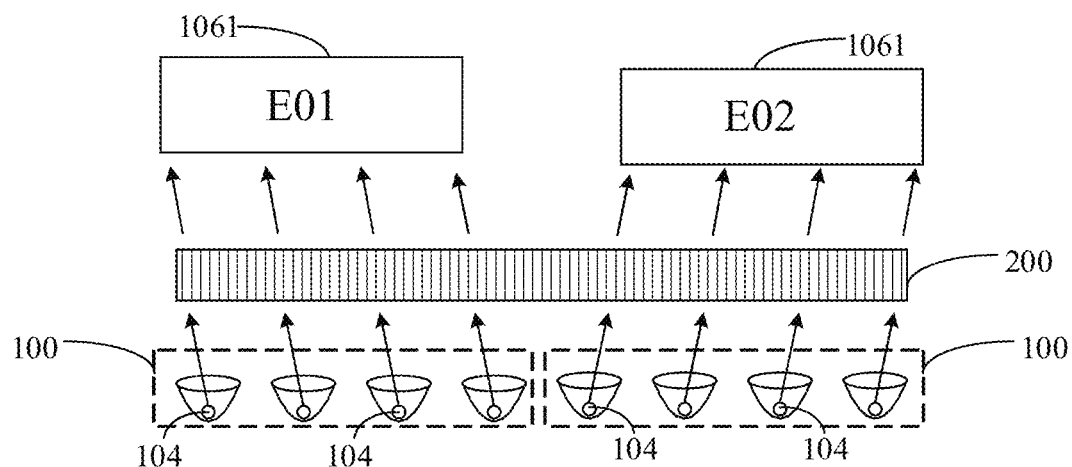
FIG. 28 shows a third structural schematic diagram of a passive light-emitting image source provided by an embodiment of the present disclosure.

Based on the above-mentioned embodiment, with reference to FIG. 28, the passive light-emitting image source includes a plurality of sets of light control apparatuses 100; and different light control apparatuses 100 are configured to emit the light emitted by the light source 104 to different directions or regions. As shown in FIG. 28, it is illustrated by taking a case that the passive light-emitting image source includes two sets of light control apparatuses 100 as an example, and by control of the light control apparatuses 100 on the light emitted by the light source 104, different images formed by the liquid crystal layer 200 can be viewed at different positions or in different regions. In FIG. 28, in order to distinguish two light control apparatuses 100, the light exit directions of two light control apparatuses 100 are different; and those skilled in the art can understand that the two light control apparatuses 100 correspond to different positions of the liquid crystal layer 200, so even though the light exit directions of the two light control apparatuses 100 are the same (for example, both the light exit directions are perpendicular to the liquid crystal layer 200), two eye box ranges can be formed. The light control apparatus 100 in this embodiment may be the light control apparatus in any one of the embodiments in FIG. 22 to FIG. 24. For example, the eye box range refers to a region where the observer can observe an image presented by the light spot.

Figure 29:
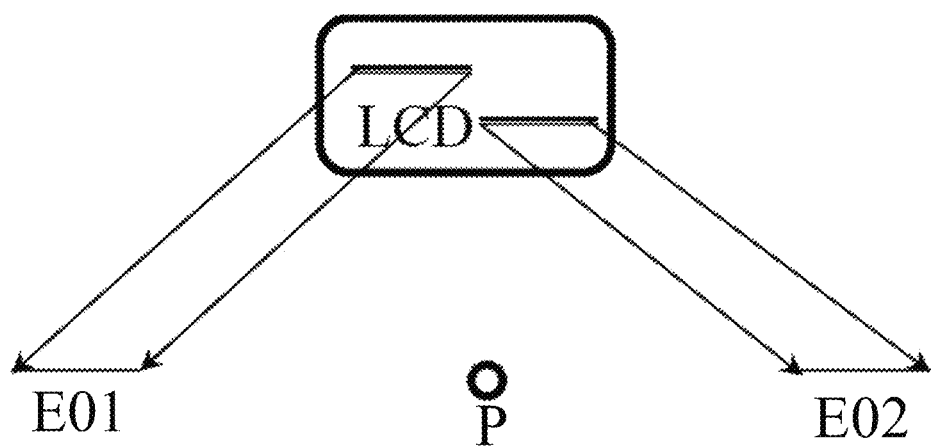
FIG. 29 shows a first schematic diagram of an observer viewing imaging of a passive light-emitting image source provided by an embodiment of the present disclosure.

For example, FIG. 29 can be referred to for the schematic diagram in which the observer views the image of the passive light-emitting image source, the passive light-emitting image source is an LCD display apparatus which includes two sets of light control apparatuses, an eyebox range E01 and an eyebox range E02 are respectively formed, an observer located in the eyebox range E01 can only see the image of the left portion of the passive light-emitting image source, and an observer in the eyebox range E02 can only see the image of the right portion of the passive light-emitting image source. Different imaging on multiple observers can be implemented by arranging a plurality of light control apparatuses 100 to facilitate viewing different image contents by different observers. FIG. 29 shows a central axis point P. Two images are viewed at the central axis point P, i.e., a crosstalk image is formed. A region where two images can be simultaneously viewed is a crosstalk region.

Figure 30:
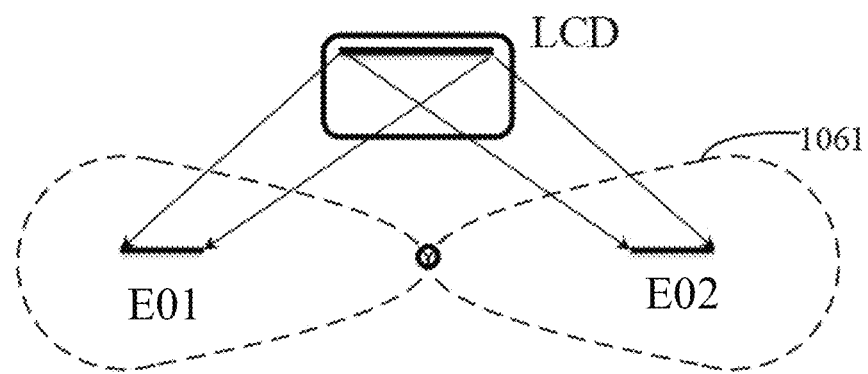
FIG. 30 shows a second schematic diagram of an observer viewing imaging of a passive light-emitting image source provided by an embodiment of the present disclosure.

Optionally, the light control apparatus 100 is provided with the diffuser element 106, and a large light spot is formed through the diffuser element 106, so that observers at different positions can also observe the image formed by the passive light-emitting image source. In order to improve the utilization rate for the light emitted by the light source 104, the diffuser element 106 is configured to form a batwing-shaped light spot (a light spot with a shape similar with an infinity symbol "∞"), i.e., by the diffuser elements 106, one set of light control apparatus can form the light spot with two main regions, i.e., the eyebox range E01 and the eyebox range E02, so that the observers in both the eyebox range E01 and the eyebox range E02 can view the image formed by the passive light-emitting image source, and FIG. 30 can be referred to for the schematic diagram of imaging in this case.

Figure 31:
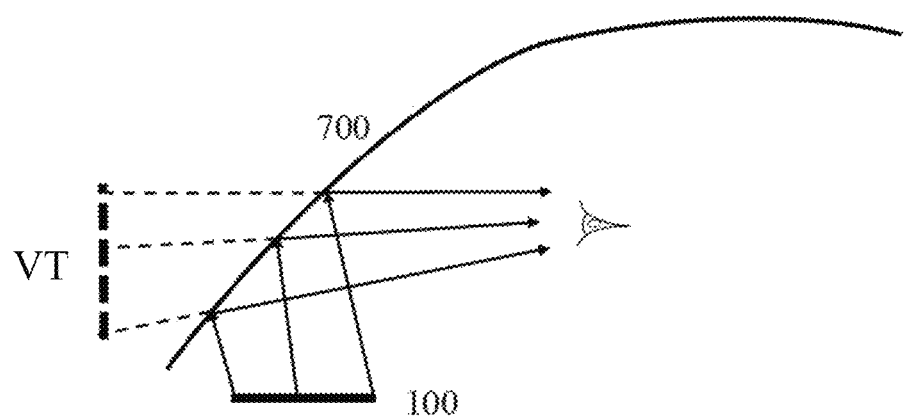
FIG. 31 shows a fourth structural schematic diagram of a passive light-emitting image source provided by an embodiment of the present disclosure.

Based on the above-mentioned embodiment, the light emitted by the light control apparatus 100 in the passive light-emitting image source is reflected to human eyes through the reflection device 700, so as to form a high-brightness virtual image VT outside the reflection device 700, and FIG. 31 can be referred to for the schematic diagram of imaging thereof. For example, the reflection device 700 may be a transparent material, e.g., a common glass, a quartz glass, an automobile windshield, a transparent resin plat, or the like, or may be a non-transparent material, e.g., a plane/concave/convex/free-form mirror coated with a reflecting layer, a reflecting film, a smooth metal reflective surface, or the like.

Figure 32A:
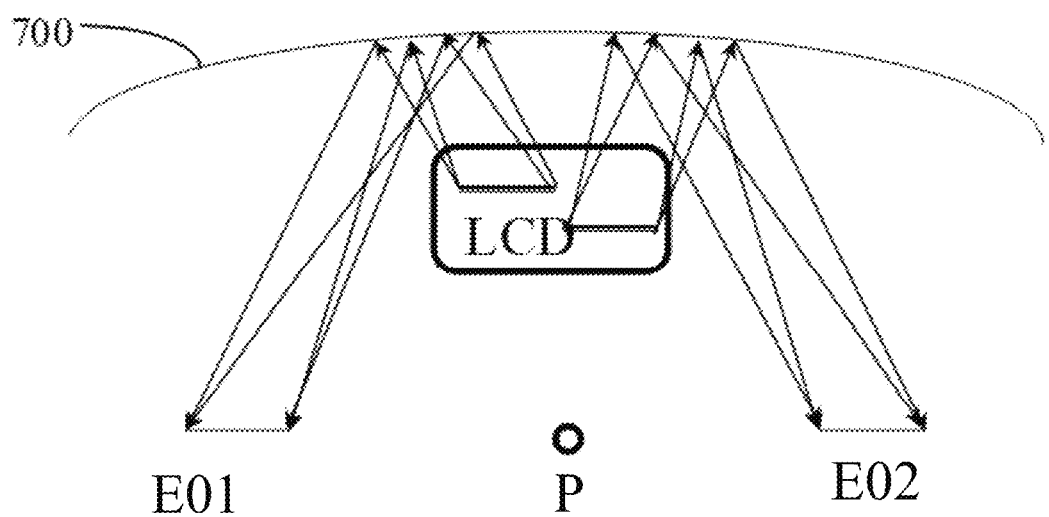
FIG. 32a shows a first schematic diagram of an observer viewing imaging of a passive light-emitting image source provided by an embodiment of the present disclosure.
Figure 32B:
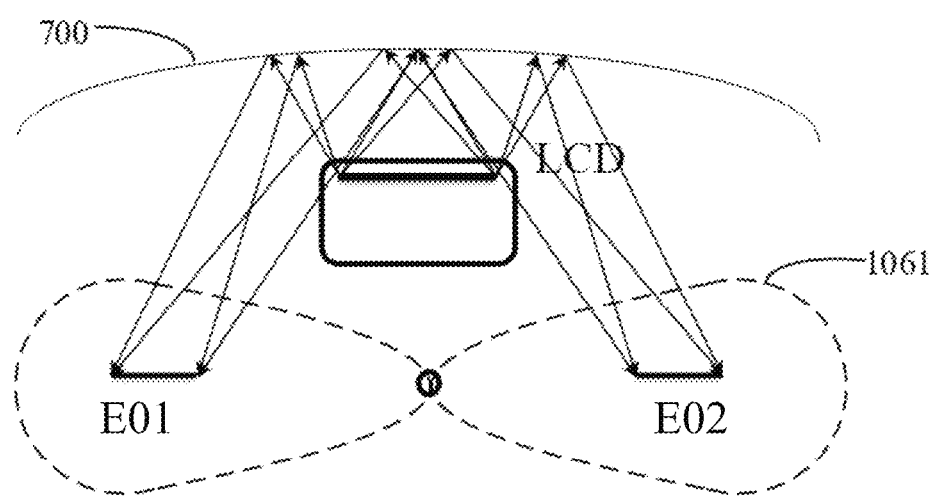
FIG. 32b shows a second schematic diagram of an observer viewing imaging of a passive light-emitting image source provided by an embodiment of the present disclosure.

In a case that there are multiple observers, when a plurality of light control apparatuses 100 are adopted, the schematic diagram of imaging thereof refers to FIG. 32a, and in FIG. 32a, two light control apparatuses 100 form two light spots, i.e., two eye box ranges E01 and E02. When the diffuser element with the large light spot (e.g., a large rectangular light spot or a batwing light spot, or the like) is adopted, FIG. 32 can be referred to for the schematic diagram of imaging of the light control apparatus 100; and FIG. 32b shows the schematic diagram in which one set of light control apparatus 100 forms the batwing light spot (the light spot with the shape similar with the infinite symbol "∞") through the diffuser element. For example, in FIG. 32a and FIG. 32b, an LCD imaging mode is illustrated exemplarily. FIG. 32a shows the central axis point P.

Based on the above embodiment, the liquid crystal layer 200 includes an RGB filter, and the passive light-emitting image source can emit R (read), G (greed), B (blue) three-color light through the RGB filter, thereby forming a color image.

For example, in some embodiments, the color image is implemented by a blue phase liquid crystal. For example, a liquid crystal layer 300 in this embodiment is the blue phase liquid crystal, and the light sources 104 include a red light source, a green light source and a blue light source; the red light source, the green light source and the blue light source work periodically, and do not work simultaneously. For example, the light sources (the red light source, the green light source and the blue light source) of three colors can form RGB backlight, and the three light sources do not work simultaneously, that is, the light source of only one color emits light at different time at most, that is, the blue phase liquid crystal can emit light of one color at a certain time point. Since the blue phase liquid crystal has a fast response speed, and the switching speed of the light sources (such as LED) is also very fast, and since human eye has a delay of about 0.2 second when recognizing a color, the human eyes can receive red, green and blue by quickly switching the light sources and correspondingly controlling a working state of the blue phase liquid crystal, and after being integrated by the human eye, the red, green and blue can synthesize multiple colors (such as yellow, magenta, white, etc.), so that people feel that they see a color image. At the same time, only one third of the light sources of the blue phase liquid crystal work, and there is no need for a color filter, which can reduce power consumption of the light sources; and one pixel of the blue phase liquid crystal can form a color pixel (a traditional liquid crystal needs three pixels), which can increase pixel density, so that definition and resolution of imaging are increased.

Figure 33:
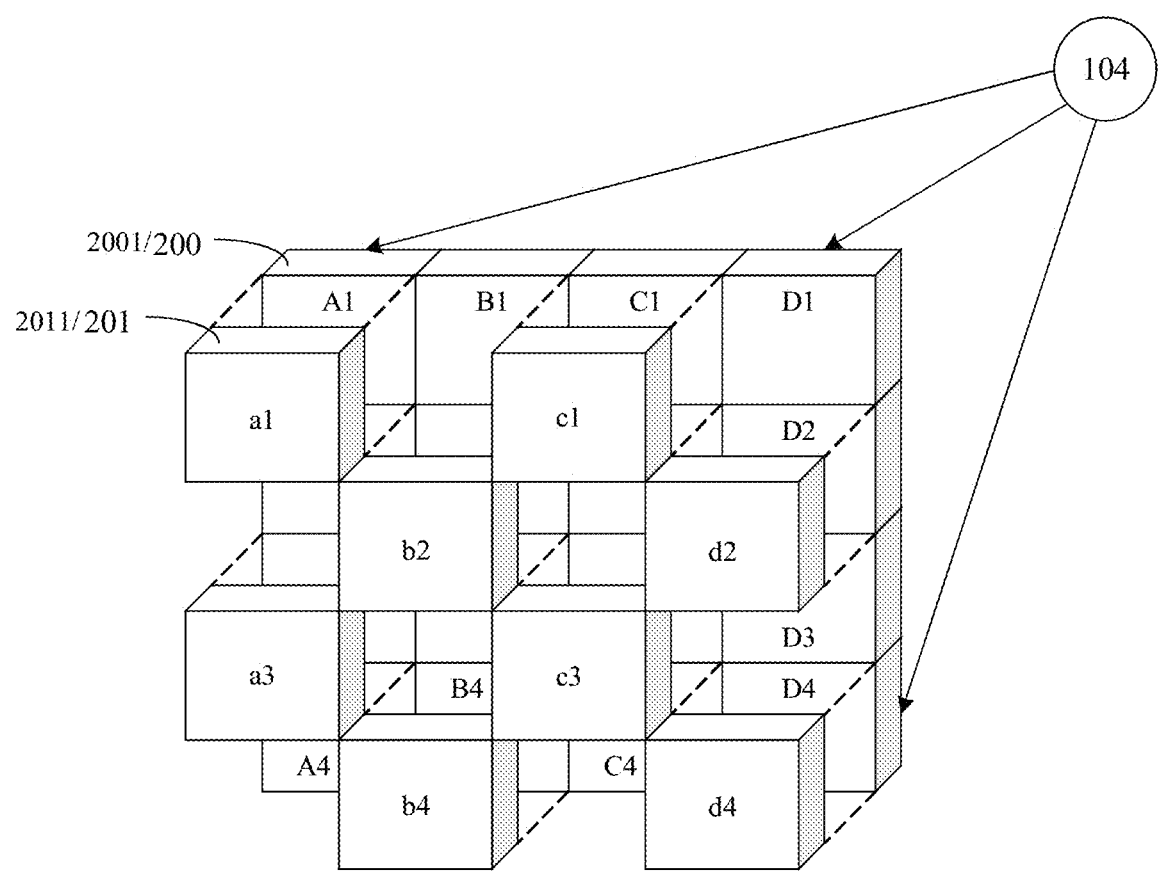
FIG. 33 shows a first structural schematic diagram of a 3D passive light-emitting image source provided by an embodiment of the present disclosure.

Based on the above embodiments, for example, the passive light-emitting image source is used as a 3D image source for the observer to view a 3D image or video. For example, referring to FIG. 33, the passive light-emitting image source further includes a liquid crystal conversion layer 201; and the liquid crystal conversion layer 201 is arranged on the side of the liquid crystal layer 200 away from the light sources 104. For example, the liquid crystal conversion layer 201 is arranged on the outer side of the liquid crystal layer 200 or the inner side of the liquid crystal layer 200, which is not limited by this embodiment. In FIG. 33, it is illustrated by taking a case that the liquid crystal conversion layer 201 is arranged on the outer side of the liquid crystal layer 200 as an example.

For example, the liquid crystal conversion layer 201 includes a plurality of liquid crystal units 2011 that are spaced, and one liquid crystal unit 2011 in the liquid crystal conversion layer 201 corresponds to one liquid crystal unit 2001 in the liquid crystal layer 200; the liquid crystal units 2001 of the liquid crystal layer 200 are configured to convert light in a first polarization direction into light in a second polarization direction, and the liquid crystal units 2011 of the liquid crystal conversion layer 201 are configured to convert the light in the second polarization direction into the light in the first polarization direction, and the first polarization direction is perpendicular to the second polarization direction.

In this embodiment, for example, the liquid crystal layer 200 uses a conventional liquid crystal, one liquid crystal unit 2001 of the liquid crystal layer 200 corresponds to one pixel, and when the liquid crystal conversion layer 201 is not arranged, the liquid crystal layer 200 can normally display a 2D image. The additional liquid crystal conversion layer 201 in this embodiment is a device consisting of the liquid crystal units 2011 that are spaced apart, and each liquid crystal unit 2011 of the liquid crystal conversion layer 201 corresponds to one liquid crystal unit 2001 in the liquid crystal layer 200. As shown in FIG. 33, the liquid crystal layer 200 includes 16 liquid crystal units 2001: A1-A4, B1-B4, C1-C4 and D1-D4, and the liquid crystal conversion layer 201 includes 8 liquid crystal units 2011: a1, a3, b2, b4, c1, c3, d2 and d4, and for example, the liquid crystal unit a1 corresponds to the liquid crystal unit A1, the liquid crystal unit a3 corresponds to the liquid crystal unit A3, and so on. By providing the liquid crystal conversion layer 201, the liquid crystal units of the liquid crystal layer 200 are divided into two parts, and one part of the liquid crystal units correspond to the liquid crystal conversion layer 201, for example, 8 liquid crystal units such as the liquid crystal units A1, A3, B2 and B4; while the remaining liquid crystal units do not correspond to the liquid crystal conversion layer 201, for example, 8 liquid crystal units such as the liquid crystal units A2, A4, B1 and, B3. In an actual production process, the liquid crystal units of the liquid crystal conversion layer 201 can be fixedly connected by a transparent material, and for example, the transparent material is arranged between the liquid crystal unit a1 and the liquid crystal unit c1, so that the entire liquid crystal conversion layer 201 can be manufactured into a whole without influencing the liquid crystal unit B1 of the liquid crystal layer 200 emitting light outward.

Also, although the liquid crystal layer 200 and the liquid crystal conversion layer 201 are essentially both liquid crystals, their polarization characteristics are not exactly the same. For example, the liquid crystal layer 200 is configured to convert the light in the first polarization direction into the light in the second polarization direction, and the liquid crystal conversion layer 201 is configured to convert the light in the second polarization direction into the light in the first polarization direction; for example, the first polarization direction is perpendicular to the second polarization direction.

Referring to FIG. 33, light emitted by the light sources 104 includes the light in the first polarization direction, or the light emitted by the light sources 104 can be converted into more light in the first polarization direction after passing through the light control apparatus 100. On the work principle of a liquid crystal, a polarization state of light will be changed during liquid crystal imaging, that is, linearly polarized light in a preset polarization direction will be converted into linearly polarized light perpendicular to the preset polarization direction after passing through the liquid crystal, and the specific preset polarization direction is determined by characteristics of the liquid crystal itself. The liquid crystal layer 200 and the liquid crystal conversion layer 201 in this embodiment adopt two different liquid crystals. For example, the light emitted by the light sources 104 are converted into light with a second polarization characteristic after passing through the liquid crystal layer 200, and then the light will be converted into light with a first polarization characteristic after passing through the liquid crystal conversion layer 201, while the liquid crystal layer not blocked by the liquid crystal conversion layer 201 still emits the light with the second polarization characteristic. Therefore, in FIG. 33, the liquid crystal units a1, a3 and the like emit the light with the first polarization characteristic, and the liquid crystal units A2, A4 and the like emit the light with the second polarization characteristic, that is, one part of pixels of the passive light-emitting image source of this embodiment emit the light with the first polarization characteristic, and the other part of pixels emit the light with the second polarization characteristic.

When the observer needs to view a 2D image, the liquid crystal layer 200 and the liquid crystal conversion layer 201 both work, and since the human eyes cannot distinguish light in different polarization states, the liquid crystal conversion layer 201 in this case is transparent, so that the observer can view the 2D image normally. When the observer needs to view a 3D image, the liquid crystal layer 200 and the liquid crystal conversion layer 201 still work normally, but it is necessary that different liquid crystal units of the liquid crystal layer are controlled to display different images, and the observer needs to wear polarized stereoscopic glasses, so that the left eye LE of the observer can view part of the image, and the right eye RE can view the other part of the image, and a 3D sense is brought to the observer by parallax between the two parts of the image. The polarized stereoscopic glasses are an existing mature technology, which will not be repeated here.

In addition, in an actual scene, it is hard that light passes through the liquid crystal conversion layer 201 completely, that is, the liquid crystal conversion layer 201 cannot be fully transparent during operation, thus causing brightness of the light passing through the liquid crystal conversion layer 201 to be relatively low. As shown in FIG. 33, brightness of light from the liquid crystal unit B1 is relatively high, and brightness of light from the liquid crystal unit a1 is relatively low due to the fact that the light passes through two layers of liquid crystals (i.e., the liquid crystal unit A1 and the liquid crystal unit a1). For example, the liquid crystal layer 200 includes 1000 liquid crystal units, 500 liquid crystal units of which are covered with the liquid crystal conversion layer 201, and the other 500 liquid crystal units are not provided with a liquid crystal conversion layer correspondingly, so that the brightness of the light from the 500 liquid crystal units covered with the liquid crystal conversion layer 201 is relatively low.

In order to guarantee imaging brightness uniformity of the image source, the total area of all the liquid crystal units in the liquid crystal conversion layer 201 is not less than half of the total area of all the liquid crystal units in the liquid crystal layer 200, that is, for the liquid crystal layer 200, the number of the liquid crystal units (such as A1, C1 and the like) corresponding to the liquid crystal conversion layer 201 is greater than or slightly greater than the number of the liquid crystal units (such as B1, D1 and the like) not corresponding to the liquid crystal conversion layer 201, which can increase overall brightness of the liquid crystal conversion layer 201, so that the overall brightness is more uniform. For example, the liquid crystal layer 200 includes 1000 liquid crystal units, 550 liquid crystal units of which are covered with the liquid crystal conversion layer 201 (that is, the liquid crystal conversion layer 201 includes 550 liquid crystal units that are spaced apart), and the other 450 liquid crystal units in the liquid crystal layer 200 are not provided with the liquid crystal conversion layer 201 correspondingly; in the liquid crystal layer 200, by increasing a proportion of the liquid crystal units corresponding to the liquid crystal conversion layer 201 in the liquid crystal layer 200, the overall brightness of the liquid crystal units in the liquid crystal layer 200 is increased.

Figure 34:
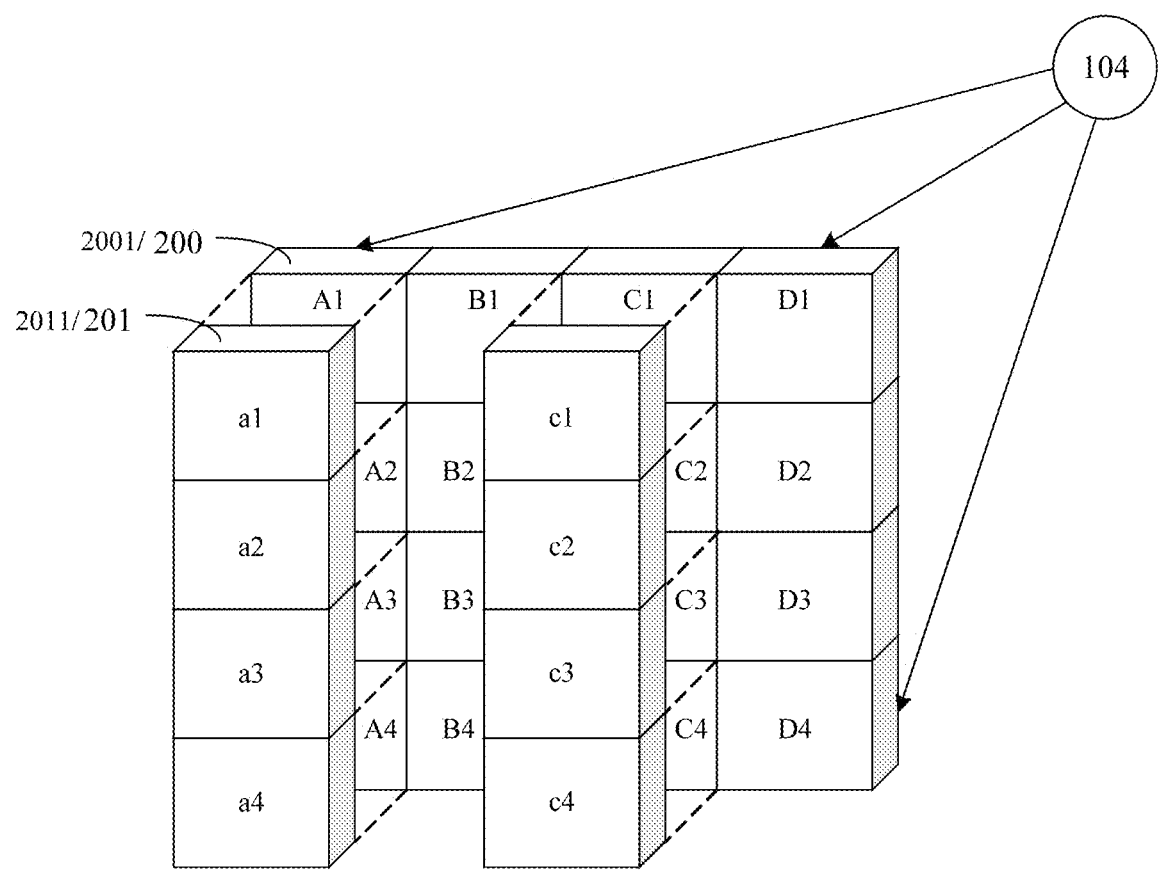
FIG. 34 shows a second structural schematic diagram of a 3D passive light-emitting image source provided by an embodiment of the present disclosure.

It is to be noted that the purpose of "spaced apart" in this embodiment is to uniformly arrange the liquid crystal units of the liquid crystal conversion layer 201, so that a proportion between the liquid crystal units (such as A1, A3 and the like) which are corresponding to the liquid crystal conversion layer 201 and are in the liquid crystal layer 200 and the liquid crystal units (such as A2, A4 and the like) which are not corresponding to the liquid crystal conversion layer 201 and are in the liquid crystal layer 200 is basically or slightly greater than 1:1. As shown in FIG. 34, the liquid crystal units 2011 of the liquid crystal conversion layer 201 are spaced apart in columns, or may be spaced apart in other ways, which is not limited in this embodiment. In addition, in order to facilitate showing a positional relationship between the liquid crystal layer 200 and the liquid crystal conversion layer 201, there is a gap between the liquid crystal layer 200 and the liquid crystal conversion layer 201 in FIG. 33 and FIG. 34; and those skilled in the art can understand that in practical application, for example, the liquid crystal layer 200 and the liquid crystal conversion layer 201 are completely bonded, and there is for example no gap therebetween.

Figure 35:
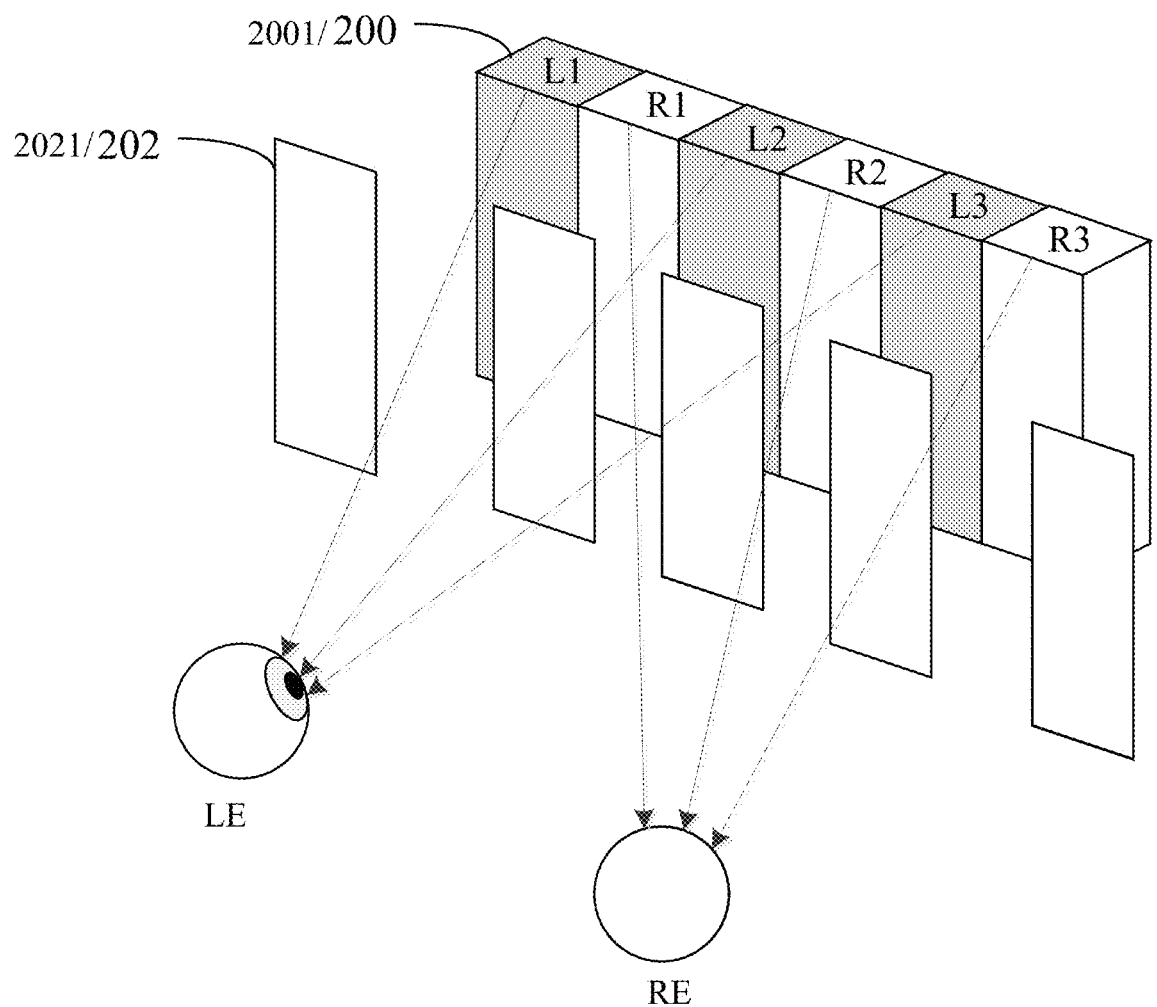
FIG. 35 shows a third structural schematic diagram of a 3D passive light-emitting image source provided by an embodiment of the present disclosure.

Based on the above embodiment, referring to FIG. 35, the passive light-emitting image source further includes: a blocking layer 202; the blocking layer 202 is arranged on the side, faces away from the light sources 104, of the liquid crystal layer 200, and a distance between the blocking layer 202 and the liquid crystal layer 200 is a preset distance; the blocking layer 202 includes a plurality of blocking units that are spaced apart.

In FIG. 35, it is illustrated by taking a case that the liquid crystal layer 200 includes 6 liquid crystal units and the blocking layer 202 includes 5 blocking units as an example. As shown in FIG. 35, since there is a gap between the blocking layer 202 and the liquid crystal layer 200, and since the blocking layer 202 can block light, light emitted by part of the liquid crystal units (R1, R2, R3) in the liquid crystal layer 200 cannot reach the position of the left eye, so that the left eye LE can only view light emitted by pixel units L1, L2, and L3; similarly, the right eye RE can only see light emitted by pixel units R1, R2 and R3. Therefore, the blocking layer 202 can divide the liquid crystal units of the liquid crystal layer 200 into two parts, and the light emitted by part of liquid crystal units such as liquid crystal units L1, L2 and L3 can only reach the position of the left eye; while the light emitted by other liquid crystal units such as liquid crystal units R1, R2 and R3 can only reach the right eye. During display imaging, two types of images with parallax are displayed by different liquid crystal units in the liquid crystal layer 200, so that there is parallax between an image viewed by the left eye and an image viewed by the right eye, thereby implementing 3D imaging.

For example, the size of each blocking unit 2021 in the blocking layer 202 and a position between the blocking units 2021 are designed after precise calculation, and then imaging can be performed at a predetermined position. In this way, the observer can view the 3D image without wearing special glasses, but the observer can view a relatively good 3D imaging effect at the predetermined position.

Optionally, the blocking unit 2021 of the blocking layer 202 is a liquid crystal. When working, the liquid crystal of the blocking layer 202 can allow light to pass through; when not working, the liquid crystal is equivalent to an opaque baffle, which can also achieve an effect of blocking the light by the blocking units. For example, when the observer is to view the 2D image, the liquid crystal of the blocking layer 202 works, and in this case, the liquid crystal layer 200 normally displays the 2D image. When the observer is to view the 3D image, the liquid crystal of the blocking layer 202 does not work, and different pixels of the liquid crystal layer 200 display images with parallax, so that the observer can view the 3D image at a specific position.

For example, the blocking layer 202 may be a complete liquid crystal, that is, the blocking layer 202 is an integral-type liquid crystal; and the blocking layer 202 is not divided into multiple blocking units in structure, and a plurality of blocking units that are spaced apart can be formed by controlling the working states of the liquid crystals of the blocking layer 202; that is, it can be determined which part of the blocking layer is to block the light (equivalent to the blocking units) and which part allows the light to pass through, and in this case, the function of not blocking the light can also be achieved. In addition, the working states of the liquid crystals in the blocking layer 202 can be controlled in combination with the position of the human eye, so that the blocking layer 202 can follow the positions of the human eyes to perform an adjustment in real time for which liquid crystal units do not work (that is, blocking the light), and which liquid crystal units allow the light to pass through (that is, there is no blocking unit), so that the observer can view the 3D image at any position, which solves the problem that the observer can only view the 3D image at the specific position after the blocking units of the blocking layer 202 are fixed.

Figure 36:
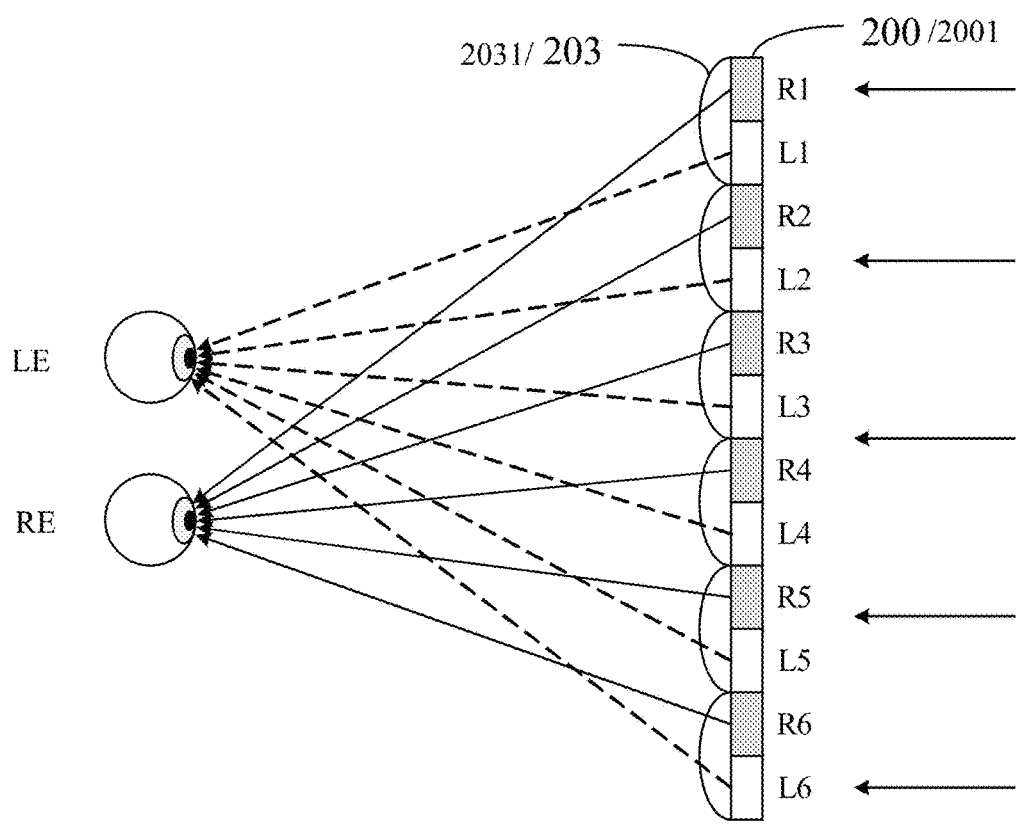
FIG. 36 shows a fourth structural schematic diagram of a 3D passive light-emitting image source provided by an embodiment of the present disclosure.

Based on the above embodiments, referring to FIG. 36, the passive light-emitting image source further includes: a cylindrical lens layer 203, and the lenticular lens layer 203 is arranged on the side of the liquid crystal layer 200 away from the light sources 104. The cylindrical lens layer 203 includes a plurality of cylindrical lenses that are vertically arranged, and each cylindrical lens covers at least two different columns of liquid crystal units 2001 of the liquid crystal layer 200. The cylindrical lenses are configured to transmit light emitted by a row of liquid crystal units to a first position, and transmit light emitted by another column of liquid crystal units to a second position.

In this embodiment, light emitted by different columns of liquid crystal units are refracted to different positions by the cylindrical lenses, so that 3D imaging can be implemented. For example, referring to FIG. 36, FIG. 36 is a top view, and in a perpendicular direction, the liquid crystal layer 200 includes 12 columns of liquid crystals, and each column of liquid crystals includes one or more liquid crystal units; in order to simplify the description, this embodiment takes each column including one liquid crystal unit as an example. The cylindrical lens layer 203 includes a plurality of cylindrical lenses 2031. For example, the cylindrical lens layer 203 includes 6 cylindrical lenses, and each cylindrical lens covers two columns of liquid crystal units. As shown in FIG. 36, the uppermost cylindrical lens covers the liquid crystal units R1 and L1. Based on a refraction characteristic of a cylindrical lens, by setting a curved surface of the cylindrical lens, light emitted by a row of liquid crystal units can be transmitted to the first position after passing through the cylindrical lens, and for example, light emitted by the liquid crystal unit R1 are transmitted to the position of the right eye; and light emitted by another column of liquid crystal units are transmitted to the second position after passing through the cylindrical lens, and for example, the light emitted by the liquid crystal unit L1 are transmitted to the position of the left eye LE. By accurately setting the shape of the cylindrical lens, the light emitted by part of the liquid crystal units can be transmitted to a certain position, and light emitted by the other part of the liquid crystal units are transmitted to another position. That is, as shown in FIG. 36, light emitted by the liquid crystal units R1, R2, R3, R4, R5, R6 and the like can be concentrated to the position of the right eye RE, and light emitted by the liquid crystal units L1, L2, L3, L4, L5, L6 and the like can be concentrated to the position of the left eye, and then the observer can view the 3D image at the specific position when different liquid crystal units of the liquid crystal layer 200 display images with parallax.

In the solution provided by an embodiment of the present disclosure, light from different positions are concentrated to the same position by a direction controller element, which can improve the brightness of the light; and the light are diffused by a diffuser element, and thus, a light spot with a preset shape can be formed, which facilitates subsequent imaging within a light spot range, so that an imaging range can be expanded while the brightness of the light is improved.

In the embodiments of the present disclosure, diffusing means that light in a light beam diverge all around, and chief light (optical axis, or light axis) of the light beam passing through the diffuser element may be unchanged or changed. For example, in some embodiments, the light beam may be diffused into two light beams after passing through the diffuser element, and optical axes of the two light beams are different from chief light of a light beam incident upon the diffuser element. The diffuser element is configured to diffuse the light beam. The area of the cross section of the light beam incident upon the diffuser element is smaller than the area of the cross sections of the light beams after passing through the diffuser element. For example, in the embodiments of the present disclosure, the "chief light" refers to a centerline of the light beam, and may refer to a main propagation direction of light.

For example, the above embodiments of the present disclosure respectively provide a head-up display system, a light control apparatus, and a passive light-emitting image source, however, the embodiments of the present disclosure are not limited thereto. For example, the light control apparatus and the passive light-emitting image source in the above embodiments can be applied to the head-up display system in the above embodiments. For example, the light control apparatus in the embodiment described in FIG. 22 or FIG. 23 can replace parts in addition to the light sources and the reflective device for displaying in the head-up display system in any of the above embodiments; or as shown in FIG. 22 or FIG. 23, the passive light-emitting image source in the above embodiments can replace parts in addition to the reflective device for displaying in any of the above embodiments.

Based on the above embodiments, the present disclosure further provides the following technical solutions.

(1) A light control apparatus is provided, the light control apparatus includes: the diffuser element and the direction controller element;

the direction controller elements is configured to concentrate light emitted by light sources at different positions; and the diffuser element is arranged on a side of the direction controller element away from the light sources, and the diffuser element is configured such that light exit from the direction controller element is diffused by the diffuser element to form a light spot.

(2) In the light control apparatus according to (1), the direction controller element includes the collimator element;

the collimator element is configured to adjust an exit direction of light to be at an angle within a preset angle range, and emit the adjusted light to the diffuser element.

(3) In the light control apparatus according to (2), the collimator element includes a collimating lens or collimating film; and the collimating lens includes one or more selected from the group consisting of a convex lens, a concave lens, a Fresnel lens, or a combination thereof.

(4) In the light control apparatus according to (3), a distance between the collimator element and a position of a light source is equal to a focal length of the collimator element.

(5) In the light control apparatus according to (1), there are a plurality of direction controller elements, and different direction controller elements are arranged at different positions, and are configured to adjust exit directions of light emitted by the light sources at different positions, and the exit directions of the light emitted by the light sources at different positions all point to a same preset position.

(6) In the light control apparatus according to (1), the direction controller element further includes the light concentrator element; the light concentrator element is arranged between the light sources and the diffuser element, and the light concentrator element is configured to concentrate the light emitted by different light sources to a same preset position.

(7) In the light control apparatus according to (1), the direction controller element further includes the reflecting element; the reflecting element includes the lamp cup; the lamp cup is a hollow housing surrounded by the reflective surface, and the direction of the port of the lamp cup faces the diffuser element; a tail end, which is away from the port, of the lamp cup is used for arranging the light source.

(8) In the light control apparatus according to (7), the direction controller element further includes: the collimator element; the collimator element is arranged inside the lamp cup, and the size of the collimator element is smaller than the size of the port of the lamp cup; the collimator element is configured to collimate part of light emitted by the light sources in the lamp cup and then transmit the collimated light to the diffuser element.

(9) In the light control apparatus according to (1), the direction controller element further includes the reflecting element; the reflecting element includes the lamp cup with a solid center; the lamp cup with a solid center is the solid transparent component with the reflective surface, and a refractive index of the solid transparent component is greater than 1; the direction of the port of the lamp cup with a solid center faces the diffuser element; the end, away from the port, of the lamp cup with a solid center is configured to arrange the light source; light emitted by the light sources are totally reflected when being transmitted to the reflective surface.

(10) In the light control apparatus according to (9), the solid transparent component is provided with the cavity at the end away from the port of the lamp cup with a solid center, and the surface, close to the port of the lamp cup with a solid center, of the cavity is a convex surface; or the solid transparent component is provided with the slot in the central position of the end close to the port of the lamp cup with a solid center, and the bottom surface of the slot is a convex surface.

(11) Embodiments of the present disclosure further provide the passive light-emitting image source, which includes the light source, the liquid crystal layer, and the light control apparatus according to any one of (1)-(10); the light source and the liquid crystal layer are arranged on two side of the direction controller element of the light control apparatus.

(12) In the passive light-emitting image source according to (11), the light source includes the electroluminescence array consisting of one or more electroluminescent modules, and each electroluminescent module includes one or more electroluminescent devices; the light control apparatus includes one or more reflecting elements, and each electroluminescent module is correspondingly provided with at least one reflecting element.

(13) The passive light-emitting image source according to (11) includes a plurality of light control apparatuses; different light control apparatuses are configured to transmit the light emitted by the light source to different directions or regions.

(14) In the passive light-emitting image source according to (11), the liquid crystal layer includes the RGB filter; or the liquid crystal layer is the blue phase liquid crystal, and the light sources include a red light source, a green light source, and a blue light source; the light source, the green light source and the blue light source work periodically, and do not work simultaneously.

(15) In the passive light-emitting image source according to (11), the passive light-emitting image source further includes the liquid crystal conversion layer; the liquid crystal conversion layer is arranged on the side, away from the light sources, of the direction controller element; the liquid crystal conversion layer includes a plurality of liquid crystal units that are spaced apart, and one liquid crystal unit in the liquid crystal conversion layer corresponds to one liquid crystal unit in the liquid crystal layer; the liquid crystal units of the liquid crystal layer are configured to convert light in a first polarization direction into light in a second polarization direction, the liquid crystal units of the liquid crystal conversion layer are configured to convert the light in the second polarization direction into the light in the first polarization direction, and the first polarization direction is perpendicular to the second polarization direction.

(16) In the passive light-emitting image source according to (15), the total area of all the liquid crystal units in the liquid crystal conversion layer is larger than or equal to half of the total area of all the liquid crystal units in the liquid crystal layer.

(17) In the passive light-emitting image source according to (11), the passive light-emitting image source further includes: the blocking layer, the blocking layer is arranged on the side of the liquid crystal layer away from the light sources, and a preset distance is set between the blocking layer and the liquid crystal layer; the blocking layer includes a plurality of blocking units that are spaced apart.

(18) In the passive light-emitting image source according to (17), the blocking unit is a liquid crystal; or the blocking layer is an integral-type liquid crystal, and by controlling the working state of the liquid crystal units of the integral-type liquid crystal, a plurality of blocking units that are spaced apart are formed.

(19) In the passive light-emitting image source according to (11), the passive light-emitting image source further including: a cylindrical lens layer, and the cylindrical lens layer is arranged on the side of the liquid crystal layer away from the light sources; the cylindrical lens layer includes a plurality of cylindrical lenses that are vertically arranged, and each cylindrical lens covers at least two different columns of liquid crystal units of the liquid crystal layer; the cylindrical lens is configured to transmit the light emitted by one column of liquid crystal units to a first position, and transmit the light emitted by another column of liquid crystal units to a second position.

(20) In the passive light-emitting image source according to (11), the light control apparatus further includes the light blocking element; the light blocking element is arranged on the side of the liquid crystal layer away from the light sources, and the light blocking element is configured to limit exit angles of the light emitted by the passive light-emitting image source.

(21) In the passive light-emitting image source according to any one of (11)-(20), the passive light-emitting image source further includes the reflection device; the reflection device is configured to reflect a light spot diffused by the light control apparatus, so that the light spot forms a virtual image outside the reflection device.

(22) Embodiment of the present disclosure further provide the head-up display system, which includes the passive light-emitting image source according to any one of (11)-(21).

The light control apparatus and the passive light-emitting image source provided by the embodiments of the present disclosure can be applied to the head-up display system provided by the embodiments of the present disclosure. In a case without conflict, different features in different embodiments can be combined with each other to obtain a new embodiment.

In the embodiments of the present disclosure, the liquid crystal layer may also be referred to as a liquid crystal unit, which includes a first substrate and a second substrate that are arranged oppositely, and a liquid crystal material layer that is sealed between the first substrate and the second substrate. For example, a first polarizing film and a second polarizing film are respectively arranged on the side of the first substrate away from the liquid crystal material layer and the side of the second substrate away from the liquid crystal material layer.

The above descriptions are only specific embodiments of the present disclosure, but the protection scope of the present disclosure is not limited thereto, those skilled in the art may make some improvements and modifications within the technical scope of the present disclosure, and the improvements and modifications should be within the protection scope of the present disclosure. Therefore, the protection scope of the present disclosure should be determined by the protection scope of the claims.

What is claimed is:

1. A head-up display system, comprising: light sources, a collimator element, a light concentrator element, a diffuser element, a liquid crystal panel and a transflective reflection device for displaying; wherein the light concentrator element, the diffuser element and the liquid crystal panel are on a same side of the light sources in a stacked manner, the light concentrator element and the diffuser element are arranged between the light sources and the liquid crystal panel;

the collimator element is configured to adjust an exit direction of light emitted by the light sources into a preset angle range;

the light concentrator element is configured to concentrate the light emitted by the light sources;

the liquid crystal panel is configured to convert the light emitted by the light sources into imaging light, and allow the imaging light to be incident on the reflection device for displaying; and the reflection device for displaying is configured to reflect the imaging light to a preset region;

the light emitted by the light sources reaches the preset region after reaching the collimator element, the light concentrator element, the diffuser element, and the liquid crystal panel and being reflected by the reflection device for displaying; the light concentrator element is configured to concentrate the light emitted by the light sources in different positions to reach a same preset position in the preset region if the diffuser element is removed from an optical path from the light sources to the preset region, and an area of the preset position is smaller than an area of the preset region;

and the diffuser element is configured to diffuse the light emitted by the light sources to the preset region.

2. The head-up display system of claim 1, wherein the collimator element is partially or entirely arranged between the light sources and the light concentrator element; and the collimator element is configured to emit adjusted light to the light concentrator element.

3. The head-up display system of claim 1, wherein the collimator element is between the light sources and the light concentrator element, and the collimator element comprises at least one selected from the group consisting of a collimating lens and a collimating film;

the collimating lens comprises one or more selected from the group consisting of a convex lens, a Fresnel lens, and a combination of lenses.

4. The head-up display system of claim 1, wherein the collimator element comprises a hollow lamp cup;

the hollow lamp cup comprises a hollow housing provided with an inner reflective surface, a port of the hollow lamp cup faces the light concentrator element, one or more of the light sources are at an end portion of the hollow lamp cup and the end portion is away from the port; or wherein the collimator element comprises a lamp cup with a solid center; the lamp cup with the solid center is a transparent component with a solid center, and a refractive index of the transparent component with the solid center is larger than 1; a port of the lamp cup with the solid center faces the light concentrator element; one or more of the light sources are at an end portion of the lamp cup with the solid center, the end portion is away from the port; and the light emitted by the one or more of the light sources are is totally reflected when the light is incident on an inner surface of the transparent component with the solid center.

5. The head-up display system of claim 4, wherein the collimator element comprises a collimating lens or/and a collimating film, the collimating lens or/and the collimating film is inside the hollow lamp cup, and a size of the collimating lens or/and the collimating film is smaller than a size of the port of the hollow lamp cup, or wherein a cavity is at the end portion of the lamp cup with the solid center away from the port of the lamp cup with the solid center, and a surface, close to the port of the lamp cup with the solid center, of the cavity is a convex surface; or a slot is in a central position, close to an end portion with the port of the lamp cup with the solid center, of the lamp cup with the solid center, and a bottom surface of the slot is a convex surface; or wherein the light sources are an electroluminescent array comprising one or more electroluminescent modules, and each of the electroluminescent modules comprises one or more electroluminescent devices; and each of the electroluminescent modules is correspondingly provided with at least one hollow lamp cup.

6. The head-up display system of claim 1, wherein the light concentrator element is between the collimator element and the diffuser element; and the light concentrator element is configured to emit concentrated light to the diffuser element.

7. The head-up display system of claim 1, wherein the diffuser element comprises a first diffuser element, and the first diffuser element is between the light sources and the liquid crystal panel;

the first diffuser element is configured to diffuse light concentrated by the light concentrator element.

8. The head-up display system of claim 7, wherein the diffuser element further comprises a second diffuser element, and the first diffuser element and the second diffuser element are stacked, and a preset distance is between the first diffuser element and the second diffuser element;

the first diffuser element and the second diffuser element are respectively arranged on two sides of the light concentrator element; or, the first diffuser element and the second diffuser element are both arranged on a side, close to the liquid crystal panel, of the light concentrator element.

9. The head-up display system of claim 1, wherein the diffuser element comprises a diffractive optical element or a scattering optical element;

the diffractive optical element is configured such that light passing through the diffractive optical element is diffused by the diffractive optical element to form one or more observation ranges with a preset cross-sectional shape, and the preset cross-sectional shape comprises a circle, an ellipse, a square, or a rectangle.

10. The head-up display system of claim 1, further comprising a polarization controller element, wherein the liquid crystal panel comprises a first polarizer, a liquid crystal layer, and a second polarizer;

the first polarizer and the second polarizer are respectively arranged on two sides of the liquid crystal layer; the first polarizer is between the liquid crystal layer and the light sources; the first polarizer is configured to transmit first linearly polarized light; the second polarizer is configured to transmit second linearly polarized light, and a polarization direction of the second linearly polarized light is perpendicular to a polarization direction of the first linearly polarized light;

the polarization controller element is between the light sources and the first polarizer, and the polarization controller element is configured to transmit the first linearly polarized light and reflect or absorb the second linearly polarized light.

11. The head-up display system of claim 1, further comprising a light scattering layer, wherein the light scattering layer is on a side, away from the liquid crystal panel, of the light blocking layer, and the light scattering layer is configured to scatter external ambient light.

12. The head-up display system of claim 1, wherein a count of collimator elements is plural, and different collimator elements are in different positions, and are configured to adjust exit directions of the light emitted by the light sources in the different positions, so that the exit directions of the light emitted by the light sources in the different positions all point to a same preset position.

13. The head-up display system of claim 1, wherein the light sources comprise a plurality of light source groups; and light emitted by different light source groups is emitted to different directions or regions.

14. The head-up display system of claim 1, wherein the liquid crystal panel comprises red, green and blue filters; or the liquid crystal panel comprises a liquid crystal layer, the liquid crystal layer is a blue phase liquid crystal, and each of the light sources comprises a red light source, a green light source, and a blue light source; the red light source, the green light source, and the blue light source are configured to operate periodically, and not to operate at same time.

15. A passive light-emitting image source, comprising a light source, a liquid crystal panel, and a light control apparatus;

the light control apparatus comprises: a diffuser element and a direction controller element;

wherein the direction controller element is configured to concentrate light emitted by a plurality of light sources located in different positions; and the diffuser element is on a side, away from the plurality of light sources, of the direction controller element; and the diffuser element is configured such that light emitted by the direction controller element is diffused by the diffuser element and form a light spot;

wherein the light source and the liquid crystal panel are respectively arranged on two sides of the direction controller element of the light control apparatus;

the direction controller element is a light concentrator element, and the light concentrator element and the diffuser element are arranged between the light source and the liquid crystal panel;

the light emitted by the light sources reaches the preset region after reaching the collimator element, the light concentrator element, the diffuser element, and the liquid crystal panel and being reflected by a reflection device for displaying; the light concentrator element is configured to concentrate the light emitted by light sources in different positions to reach a same preset position in the preset region if the diffuser element is removed from an optical path from the light source to the preset region, and an area of the preset position is smaller than an area of the preset region;

and the diffuser element is configured to diffuse the light emitted by the light source to the preset region.

16. A head-up display system, comprising the passive light-emitting image source of claim 15.

17. The passive light-emitting image source of claim 15, wherein the light emitted by the plurality of light sources passes through the direction controller element and the diffuser element to reach a first preset region; the direction controller element is configured to concentrate the light emitted by the plurality of light sources, and light concentrated by the direction controller element reaches a second preset region in the first preset region if the diffuser element is removed from an optical path from the plurality of light sources to the first preset region, and an area of the second preset region is smaller than an area of the first preset region.

\* \* \* \* \*